United States Patent [19]
Abbott

[11] Patent Number: 5,974,435
[45] Date of Patent: Oct. 26, 1999

[54] RECONFIGURABLE ARITHMETIC DATAPATH

[75] Inventor: Curtis Abbott, Menlo Park, Calif.

[73] Assignee: Malleable Technologies, Inc., San Jose, Calif.

[21] Appl. No.: 08/953,766

[22] Filed: Oct. 17, 1997

Related U.S. Application Data

[60] Provisional application No. 60/057,156, Aug. 28, 1997.

[51] Int. Cl.$^6$ ..................................................... G06P 7/52
[52] U.S. Cl. ........................................... 708/523; 708/629
[58] Field of Search ........................ 364/736.01, 736.02, 364/754.01, 758, 760.02, 760.03

[56] References Cited

U.S. PATENT DOCUMENTS

| | | | |
|---|---|---|---|
| 3,866,030 | 2/1975 | Baugh et al. | 235/164 |
| 5,185,706 | 2/1993 | Agrawal et al. | 364/489 |
| 5,220,213 | 6/1993 | Chan et al. | 307/465 |
| 5,231,588 | 7/1993 | Agrawal et al. | 364/489 |
| 5,446,651 | 8/1995 | Moyse et al. | 364/760.03 |
| 5,751,619 | 5/1998 | Agarwal et al. | 364/736.02 |

OTHER PUBLICATIONS

Earl E. Swartzlander, Jr., "Merged Arithmetic", IEEE Transactions on Computers, vol. C–5/, No. 10, Oct. 1980, pp. 946–950.

Charles R. Baugh and Bruce A. Wooley, "A Two's Complement Parallel Array Multiplication Algorithm", IEEE Transactions on Computers, vol. C–22, No. 12, Dec. 1973, pp. 1045–1047.

C.S. Wallace, "A Suggestion for a Fast Multiplier", IEEE Transactions on Electronic Computers, Feb. 1964, pp. 14–17.

Zhi–Jian (Alex) Mou, "Overtruned–Stairs Adder Trees and Multiplier Design", IEEE Transactions on Computers, vol. 41, No. 8, Aug. 1992, pp. 940–948.

*Primary Examiner*—Robert W. Beausoliel, Jr.
*Assistant Examiner*—Pierre E. Elisca
*Attorney, Agent, or Firm*—Blakely Sokoloff Taylor & Zafman

[57] ABSTRACT

A method and apparatus that combines the same basic hardware elements in several ways to perform a plurality of arithmetic operations over different numbers of operands of different lengths. The allowed options include the multiplication and summing of several operands in a single operation. The reuse of hardware elements is obtained by the use of a multiplication hardware structure together with multiplexer logic (or similar selection logic) at appropriate points in the hardware structure, which allows a minimum of extra hardware and a small number of extra gate delays along any critical path, thereby ensuring that the flexibility to use different operand lengths and numbers of operands incurs only a small penalty in processing speed and/or chip area in a VLSI circuit implementation.

36 Claims, 12 Drawing Sheets

RECONFIGURABLE ARITHMETIC DATAPATH

This application claims the benefit of U.S. Provisional Application No. 60/057,156, filed Aug. 28, 1997.

BACKGROUND OF THE INVENTION

1. Field of the Invention

The invention relates to the field of hardware designs for performing arithmetic operations. More specifically, the invention relates to the hardware designs for performing multiplication, sums of products, and the like.

2. Background Information

Fast multiplication and addition are key arithmetic operations in digital signal processing (DSP), as well as other forms of computer data processing. In DSP especially, it is often necessary to multiply several pairs of numbers and accumulate the results by addition into a single number. Mathematically, this operation is called a "dot product." It can be written $a_1*b_1+a_2*b_2+ \ldots +a_n*b_n$, where the $a_i$ and $b_i$ sequences are paired up, and each corresponding element is multiplied, with the results accumulated. In a typical digital filter, the first sequence may be a fixed sequence of filter coefficients, while the second sequence may be a contiguous set of data samples from a longer input sequence. For example, the finite impulse response (FIR) filtering operation consists of performing the dot product operation with these sequences to produce an output sample, then "shifting" the input sequence in time by one, so that the earliest sample is no longer included while one later sample is appended. The dot product operation is then repeated on the new pair of sequences to form the next output sample, and so on.

Many useful variations of this basic idea exist. For example, the filter coefficients may be changed at regular intervals, including as often as every output sample. This is commonly done, for example, in adaptive filtering, where an adaptation algorithm such as "least mean squared" (or "LMS") is used to change the filter coefficients. As another example, the input sequence may be shifted by more than one input sample between each output sample. When the filter coefficients are properly chosen, this technique can be used to reduce the sampling rate of a digitally sampled signal. As still another example, two or more sets of filter coefficients may be applied to the same input sequence in turn between each shift of the input sequence. When the filter coefficients are properly chosen, this technique can be used to increase the sampling rate of a digitally sampled signal.

Infinite impulse response (IIR) filters are also widely used in DSP. These filters employ feedback, whereby the values of previous outputs are multiplied by filter coefficients and summed with other results to produce each successive output sample. While such filters are not described as a single dot product operation, they may often be described using several dot products.

Still other important DSP algorithms use sums of products. For example, the "sum of squares of differences" operation is written as $(a_1-b_1)^2+(a_2-b_2)^2+ \ldots (a_n-b_n)^2$. This is used, for example, to measure the amount of difference between the vectors a and b, each of length n. When b represents a desired or known vector, it is common to search among a set of candidate vectors for the vector that minimizes this difference. In this case, the sum of squares of differences operation is repeated many times during the operation of the complete system.

The precision requirements for these multiplication and addition operations can vary tremendously, as can the desired representations of the numbers involved. For example, in some applications it is desired to use floating point number representations; in others, the fixed point representation is sufficient and is more cost effective. Among fixed point representations, the number of integral and fractional digits can vary, as can the total number of digits. Additionally, the numbers may be signed or unsigned. Beyond the data representations themselves, certain details of the processing operations are important. For example, multiplication and addition operations produce outputs with a greater number of digits than their inputs. Thus, when such operations are composed, the number of digits in the results can grow dramatically. Commonly, the exact results include digits that do not represent useful information, so some digits are discarded using truncation and rounding. The art of discarding digits that are not useful is both important and complex.

The precision requirements for the multiplication and addition operations are generally related to: the precision of the input data; the precision of the coefficients; the type of processing algorithm; and certain parameters of that algorithm such as how truncation and rounding are performed. The analysis of these requirements is sufficiently complex that a whole branch of mathematics, known as Numerical Analysis, has been developed for them.

In response to the widespread need for fast multiplication and addition with a variety of precisions and data representations, an extensive literature has been created and many hardware and software implementations have been developed. For most implementations, the complexity increases roughly as N*M where N and M are the number of bits of the two input operands. Thus, for N by N multiplication, the complexity increases as $N^2$. Algorithms are known that reduce this complexity for very large operands, but for most applications, the operand sizes are not large enough to make these algorithms practically useful. On the other hand, many ideas have been developed that do effectively exploit properties of hardware technologies and multiplication algorithms to speed up implementations having a particular precision and numerical representation.

The straightforward approach to multiplication is adding up a set of appropriately shifted partial products, each generated by multiplying the multiplicand by one of the digits of the multiplier. The only difficulty about addition is carries between digits, since the carry out from a particular digit depends on the carry into that digit, so that the carry propagation aspect of addition is inherently sequential. Since it is possible that a carry may propagate across all the digits of a sum, the number of sequential steps required for the addition is equal to the number of digits being added. Many techniques are known for reducing the maximum number of sequential steps requires for the addition; however these techniques generally require more hardware.

Many hardware designs for fast multiplication embody an extended version of the straightforward multiplication algorithm, consisting of a first part that generates partial products, a second part that sums the partial products to two numbers (referred to as "carry" or "C" and "save" or "S") whose sum is the correct answer, and a third part that adds together C and S to produce the answer. The partial product generation may include any form of multiplicand preprocessing, such as Booth encoding. The numbers C and S are developed in such a way that carry propagation is largely or completely avoided during the second part. The apparatus implementing the second part is generally known as a "Carry Save Adder," sometimes abbreviated "CSA." Carry propagation is unavoidable during the third part of the multiplication algorithm, but only two numbers are then involved, and any of the known techniques can be used to speed up the addition. The third part of this multiplication algorithm is also called the "Carry Propagate Adder," sometimes abbreviated "CPA".

The variations among hardware multiplier designs of this type generally involve one or more of the following: the method for generating partial products, the method for reducing them to numbers C and S, the method for performing the final addition of numbers C and S, and the method for modifying the partial products and/or carry save adder to accommodate signed number representations.

Because of the inherent complexity of multiplication, fast multiplication hardware has commonly been developed for a single number representation at a single precision. Certain variations cause few design changes, such as signed versus unsigned numbers. For this reason, such variations are commonly found within a single hardware multiplier. Other variations can be provided by appropriate modifications of the inputs and/or outputs. For example, the position of integral and fractional parts in a fixed point multiplier can be varied by shifting inputs and outputs; smaller operands can be accommodated by padding the inputs with zero or sign digits as appropriate. This padding of input digits has significant drawbacks: since the inherent complexity of an N by N multiplier increases as $N^2$, use of half-length operands reduces the inherent complexity by a factor of 4, which corresponds intuitively to using ¼ of the multiplier hardware.

More generally, systems applications may use several of the DSP algorithms that were just briefly described, and may use other algorithms involving multiplications and additions as well. Depending on the total throughput required by the application, it may be necessary to provide dedicated hardware multiplication and addition circuits for each operation through which data flows in fixed connection patterns, or on the other hand, it may be possible to reuse one or more hardware multiplication and addition circuits with data flows directed by a control element. An example of the second approach is a programmable DSP chip or RISC CPU chip containing hardware multiplication circuitry. These programmable circuits usually implement complex numerical algorithms by the sequential composition of simpler operations into and out of register files that store intermediate results, coefficients, and so on. For example, a sum of squares of differences algorithm may be implemented by a first operation that takes the difference of two numbers, a second operation that squares the result, and a third operation that accumulates the result of the second operation into a running sum. In case each operation takes a single cycle, the algorithm would then be completed in 3 cycles.

However, since the inherent complexity of multiplication is higher than that of addition or subtraction, hardware designers often optimize the clock speed of their designs by pipelining the multiplication operation, so that it completes after more than one cycle. For example, a particular design might complete in 3 cycles but allow a new multiply operation to be started on every cycle. In such a case, the sum of squares of differences algorithm discussed earlier might complete in 5 cycles. Depending on certain details of the hardware design, it might be possible to overlap the calculation for the next pair of vector elements so that on average, each pair of elements would be subtracted, squared, and summed in 3 cycles.

While many design variations are possible that involve more or less parallel hardware, it is generally desirable for designs to require as few cycles as possible to complete an algorithm; this is especially important for the most widely used algorithms, including those mentioned in the foregoing. If a first design uses K cycles while a second uses L>K, then the first design is also more cost-effective if it uses less than L/K as much hardware. Implementers of systems applications are generally desirous of designs that are fast, cost-effective, and reconfigurable.

BRIEF SUMMARY OF THE INVENTION

A method and apparatus for providing reconfigurable hardware multiplication, addition, and/or subtraction is described. According to one aspect of the invention, multiplication hardware is provided that includes a partial product generator, a carry save adder, and a carry propagate adder, each modified to allow reconfigurability. More specifically, the routing of inputs to the partial product generator unit is controlled by multiplexers (or equivalent selection logic), and the interpretation of these inputs is affected by separately provided control bits, so that partial products can be generated corresponding to a plurality of distinct arithmetic operations, including operations that add or subtract the results of multiplying several pairs of input numbers together. The routing of partial products to reduction elements of the carry save adder is controlled by multiplexers (or equivalent selection logic) and gating circuits so that the summation pattern of the carry save adder is reconfigurable according to the operation specified by the separately provided control bits. The carries within the carry save adder and carry propagate adder are conditionally broken at selected points so that these adders may perform either a single operation on wide operands or several simultaneous operations on narrower operands.

According to another aspect of the invention, pipelining is introduced, preferably into 3 pipeline stages. In this embodiment of the invention, the C and S outputs of the carry save adder from one cycle may optionally be routed into the carry save adder on the next cycle as additional input elements, whereby multiply-accumulation of successive results is provided. According to another aspect of the invention, the pipelined embodiment of the invention may be further elaborated by introducing a control signal that selects both multiplication operands from the same source, thereby implementing a squaring operation, and by including subtraction circuitry at the initial stage and routing inputs through the subtraction circuitry, whereby the multiplier may optionally produce the squares of differences, or sums of squares of differences if the partial product generator and the carry save adder are configured to produce sums of products.

DETAILED DESCRIPTION OF THE INVENTION

In the following description, numerous specific details are set forth to provide a thorough understanding of the invention. However, it is understood that the invention may be practiced in many different embodiments wherein the specific details will be different. In other instances, certain circuit components for which the function and realization are well known and which are not central to the invention are shown in less detail to avoid obscuring the invention.

Datapath Overview

Figure 1:
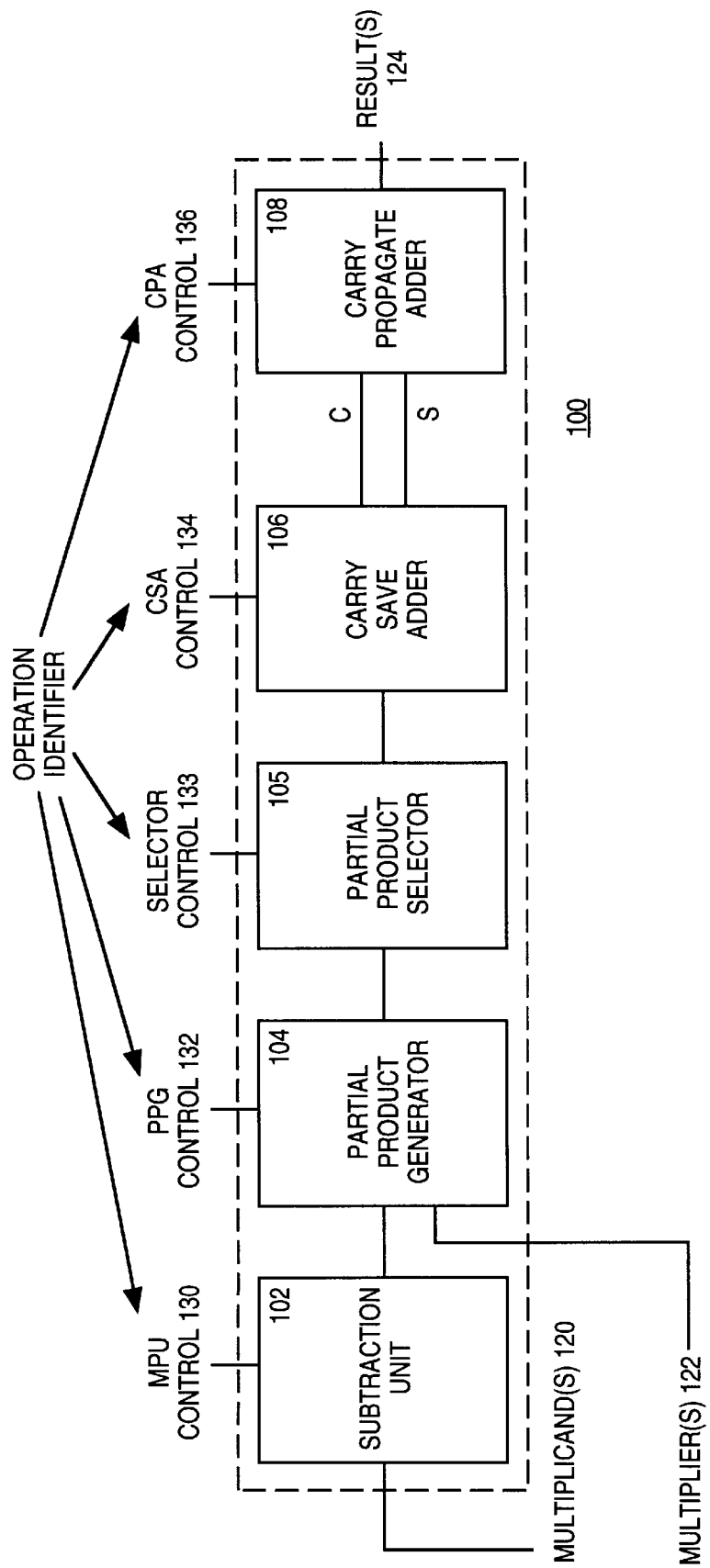
FIG. 1 is a block diagram illustrating a reconfigurable arithmetic datapath according to one embodiment of the invention.

FIG. 1 is a block diagram illustrating a reconfigurable arithmetic datapath according to one embodiment of the invention. The reconfigurable arithmetic datapath 100 includes inputs for a set of multiplicand bits 120 and a set of multiplier bits 122, as well as an output for a set of result bits 124. In one embodiment, the sets of multiplicand, multiplier, and result bits may each be 64 bits wide.

The arithmetic datapath is reconfigurable in the sense that it can perform any one of a number of predetermined operations based on control inputs. Based on the currently selected operation, each set of multiplicand bits 120 input to the reconfigurable arithmetic datapath 100 is selectively interpreted as one or more signed and/or unsigned numbers of a given length, while each set of multiplier bits 122 is interpreted as one or more signed and/or unsigned numbers of a possibly different length. The multiplicand and multiplier are acted upon by a succession of interconnected processing units, including a subtraction unit 102, a partial product generator (PPG) 104, a partial product selector 105, a carry save adder (CSA) 106, and a carry propagate adder (CPA) 108. Each of the interconnected processing units has separate control inputs, including Subtraction Control 130 which is connected to the subtraction unit 102, PPG Control 132 which is connected to the partial product generator 104, a Selector Control 133 which is connected to the partial product selector 105, CSA Control 134 which is connected to the carry save adder 106, and CPA Control 136 which is connected to the carry propagate adder 108. Each control input affects its associated processing unit in ways that are described in the following to collectively perform the selected operation. The independent nature of each control input allows the greatest possible reconfigurability of the arithmetic datapath 100 subject to the limitations of each processing unit and of the numbers of inputs and outputs.

The subtraction unit 102 receives the multiplicand input 120, and interprets it in one of several predetermined ways according to the value of the Subtraction control input 130. In one embodiment, the subtraction unit 102 produces the multiplicand(s) or the result of subtracting certain of the interpreted multiplicand(s).

The partial product generator 104 receives both the multiplier input 122 and the results of the subtraction unit 102, and interprets them in one of several predetermined ways according to the value of the PPG control input 132. The partial product generator 104 produces all of the unsigned partial products required to perform any of the operations supported by the reconfigurable arithmetic datapath. In particular, it produces all partial products for the unsigned parts of each of the multiplicand(s) and multiplier(s) that are intended to be multiplied and summed together, and for the necessary adjustments and corrections for signed operands.

The partial product selector 105 receives the Selector Control input 133 and the results of the partial product generator 104. The partial product selector 105 selects the appropriate partial products for the current operation and provides them to the carry save adder 106.

The carry save adder 106 receives the CSA control input 134 and the partial products selected by the partial product selector 105. In one embodiment, the carry save adder's inputs are organized into columns, each column representing partial products that have a specific numeric significance, expressed as a power of 2. A different number of inputs may be routed to each column according to the requirements of a particular one of the supported operations, which operation is conveyed within the PPG control input 132, the Selector Control input 133, and the CSA control input 134. The carry save adder 106 sums the inputs to each column together with any carries out of the next lesser column. The summing circuitry within each column is a composition of reducers as the term is generally used in the literature on multiplication, and 3-2 reducers in the case of one described embodiment. The result of each column reduction is a carry bit C, a sum bit S, and a set of carries out. The carries out of a given column are fed to the next greater column. This arrangement, which is described in greater detail later herein, produces vectors C and S whose sum is the sum of all the input vectors to the carry save adder.

The carry propagate adder 108 receives the C and S outputs of the carry save adder and sums them according to CPA Control inputs 136 to produce, in the preferred embodiment, either a single 64-bit number or a pair of 32-bit numbers.

Figure 2:
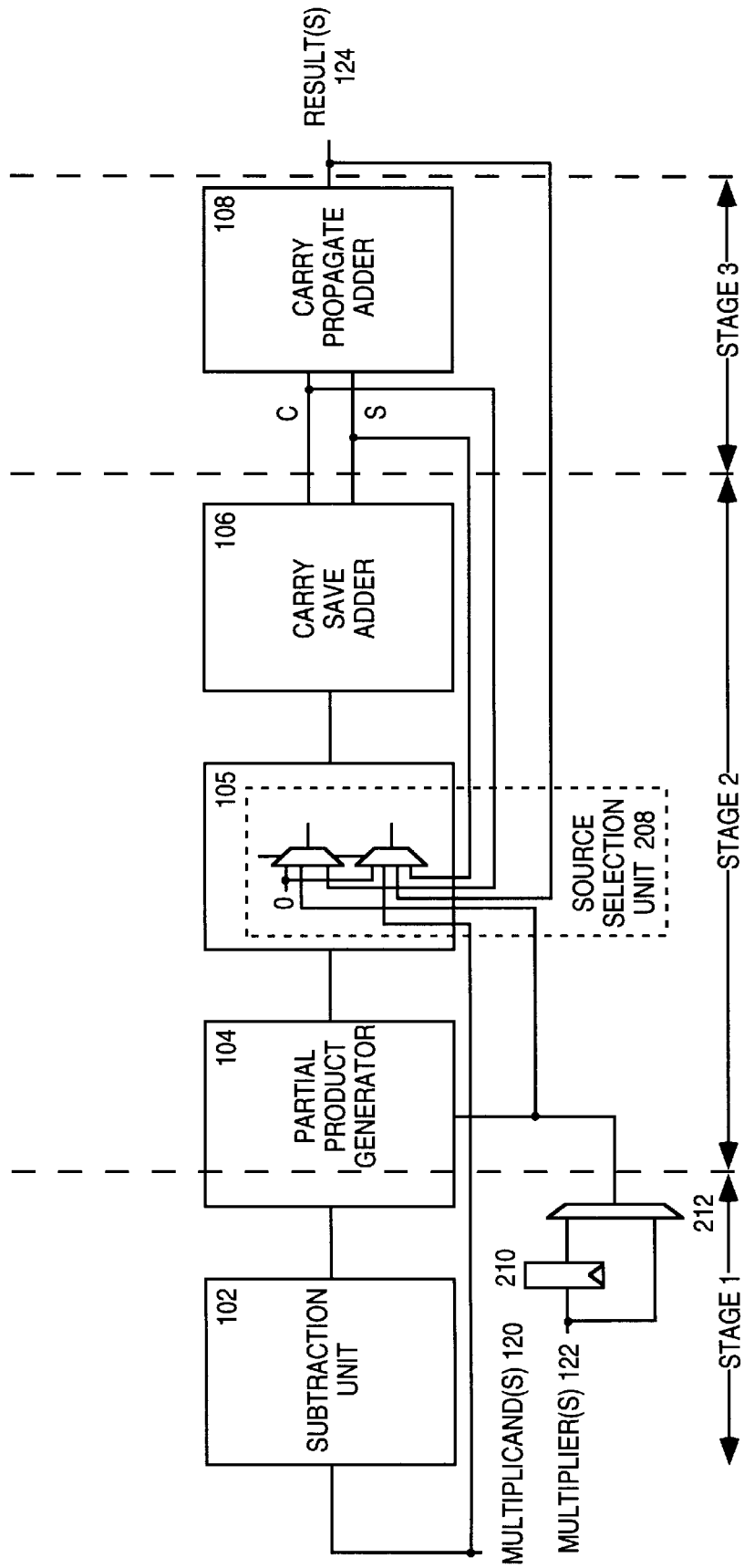
FIG. 2 is a block diagram illustrating a pipelined version of a reconfigurable arithmetic datapath according to one embodiment of the invention.

FIG. 2 is a block diagram illustrating a pipelined version of the reconfigurable arithmetic datapath shown in FIG. 1 according to one embodiment of the invention, which may be advantageous for certain applications. In addition to the elements shown in FIG. 1, the reconfigurable arithmetic datapath of FIG. 2 is divided into three pipeline stages. In one embodiment, each stage ends with registers that effectively partition the reconfigurable arithmetic datapath. When each of these registers is controlled by a clock according to standard hardware design practice, the reconfigurable arithmetic datapath 100 takes on a number of new properties compared with the version shown in FIG. 1. One such property is that three clock cycles must elapse before input data can reach the output 124, since along at least one path it must pass through pipeline registers placed between stages 1, 2, and 3. Also, if new data is fed to the inputs on each clock cycle, three operations may be in progress concurrently; one in stage 1, one in stage 2, and one in stage 3. Also, since the longest path within any of these parts is shorter than the longest path from input to output in the unpipelined version of the design, the pipelined version may allow a higher clock speed than the unpipelined version. While one embodiment is described in which the reconfigurable arithmetic datapath is partitioned in 3 specific places to create pipeline stages, alternative embodiments could partition the reconfigurable arithmetic datapath in more, less and/or different places.

FIG. 2 also shows a source selection unit 208 that feeds additional inputs into the carry save adder 106. These additional inputs are selected by multiplexers that allow selection of various sources including: zero; multiplier input 122; multiplicand input 120; both C and S components of the carry save output register 204; and the result 124. If the C and S inputs from the next pipeline stage are selected into the carry save adder 106, the effect will be to accumulate the results of the previous clock cycle into the results provided by the partial product generator 104 in the current cycle, thereby generalizing whatever operations are already supported by the reconfigurable arithmetic datapath to also include versions of those operations with accumulation. The approach shown in FIG. 2 is superior to a multiplier that allows an accumulation register to be optionally added to the multiplication result, since an extra operation cycle may be required to initially clear this accumulator register. In the embodiment shown in FIG. 2, accumulation of successive results is supported without a separate accumulator register or the need for a clearing operation. Additionally, through the other input paths to the source selection unit 208, a result of a previous, non-successive operation can be captured in a register file external to the reconfigurable arithmetic datapath 100 and fed back into the accumulation later, which allows for still further flexibility.

In the embodiment shown in FIG. 2, the multiplier input 122 is connected to the second pipeline stage through a multiplexer 212 which selects either the current or a pipelined version of the signal stored in a pipeline register 210. When the pipeline register 210 is selected, the multiplier and multiplicand inputs for a given operation may be presented to the datapath simultaneously; when the direct input is selected, the operation involves the multiplicand input 120 from the previous clock cycle and the multiplier input 122 from the present one.

It will be understood that the pipeline register partitioning shown is only one of many possible such partitionings, and that features such as the multiplier pipeline register 210 and multiplexer 212 may be added or deleted in different embodiments of the invention.

Reconfigurability Overview

The control inputs provided to the various processing units in FIGS. 1 and 2 select, among other things, how the multiplicand and multiplier input bits are interpreted by the subtraction unit and partial product generator, which partial products the partial product selector 105 chooses, how the carry save adder and carry propagate adder treat certain carry out bits, and so on. The control bits together define the set of operations that is supported in the reconfigurable arithmetic datapath. To show how a specific embodiment applies to each of the processing units shown in FIG. 1 or FIG. 2, specific values for the supported operations of one embodiment (e.g., 64 bit multiplicand and multiplier inputs) are given next, and are used in the rest of the detailed description. However, it will be understood that other operations might be selected for a different embodiment within the scope of the present invention, and that these would engender corresponding differences in certain details of the processing units.

One embodiment of the invention provides the operations shown below in Table 1. In this table, multiplicands are shown as $MD_m[i]$ where m is the length in bits and i is the index, where 1 is the smallest index. Multipliers are shown as $MR_n[i]$ where n is the length in bits and i is the index.

TABLE 1

| # | Operation |
|---|---|
| 1 | all = $(MD_8[5]-MD_8[1])^2 + (MD_8[6]-MD_8[2])^2 + (MD_8[7]-MD_8[3])^2 + (MD_8[8]-MD_8[4])^2$ |
| 2 | all = $(MD_{10}[4]-MD_{10}[1])^2 + (MD_{10}[5]-MD_{10}[2])^2 + (MD_{10}[6]-MD_{10}[3])^2$ |
| 3 | all = $(MD_{16}[3]-MD_{16}[1])^2 + (MD_{16}[4]-MD_{16}[2])^2$ |
| 4 | low = $MD_{13}[1]*MR_{10}[1] + MD_{13}[2]*MR_{10}[2] + MD_{13}[3]*MR_{10}[3] + MD_{13}[4]*MR_{10}[4]$;<br>high = $MD_{13}[1]*MR_{10}[2] + MD_{13}[2]*MR_{10}[3] + MD_{13}[3]*MR_{10}[4] + MD_{13}[4]*MR_{10}[5]$; |
| 5 | low = $MD_{13}[1]*MR_{10}[1] + MD_{13}[2]*MR_{10}[2] + MD_{13}[3]*MR_{10}[3] + MD_{13}[4]*MR_{10}[4]$;<br>high = $MD_{13}[1]*MR_{10}[3] + MD_{13}[2]*MR_{10}[4] + MD_{13}[3]*MR_{10}[5] + MD_{13}[4]*MR_{10}[6]$; |
| 6 | low = $(MD_{16}[1]*MR_{16}[1]-MD_{16}[2]*MR_{16}[2])/2$;<br>high = $(MD_{16}[1]*MR_{16}[2] + MD_{16}[2]*MR_{16}[1])/2$ |

TABLE 1-continued

| # | Operation |
|---|---|
| 7 | low = (MD$_{16}$[1]*MR$_{16}$[1] + MD$_{16}$[2]*MR$_{16}$[2])/2;<br>high = (MD$_{16}$[1]*MR$_{16}$[2] + MD$_{16}$[2]*MR$_{16}$[3])/2 |
| 8 | low = (MD$_{16}$[1]*MR$_{16}$[1] + MD$_{16}$[2]*MR$_{16}$[2])/2;<br>high = (MD$_{16}$[1]*MR$_{16}$[3] + MD$_{16}$[2]*MR$_{16}$[4])/2 |
| 9 | low = MD$_{16}$[1]*MR$_{16}$[1];<br>high = MD$_{16}$[2]*MR$_{16}$[2] |
| 10 | all = MD$_{22}$[1]*MR$_{22}$[1] + MD$_{22}$[2]*MR$_{22}$[2] |
| 11 | all = MD$_{22}$[1]*MR$_{22}$[1] |
| 12 | all = MD$_{31}$[1]*MR$_{31}$[1] |

As illustrated in Table 1, the sixty-four multiplicand input bits are interpreted as either eight 8-bit signed numbers, six 10-bit signed numbers, four 13-bit signed numbers, two 16-bit signed numbers, two 22-bit signed numbers, or one 31-bit signed number. For example, in operation 3 of Table 1, the multiplicand input bits are interpreted as four 16-bit numbers; thus, bits 1 through 16 of the multiplicand input bits could form MD$_{16}$[1], bits 17 through 32 of the multiplicand input bits could form MD$_{16}$[2], and so forth.

As also illustrated by Table 1, the sixty-four multiplier input bits are interpreted as either six 10-bit signed numbers, four 16-bit signed numbers, two 22-bit signed numbers, or one 31-bit signed number. For example, in operation 4 of Table 1, the multiplier input bits interpreted as five 10-bit numbers; thus, bits 1 through 10 of the multiplier input bits could form MR$_{10}$[1], bits 11 through 20 could form MR$_{10}$[2], bits 21 through 30 could form MR$_{10}$[3], bits 33 through 42 could form MR$_{10}$[4], and so forth. Other ways of interpreting input bits as multiplier and/or multiplicand operands are possible.

In Table 1, the output labeled "low" means the least significant 32 bits of the result; that labeled "high" means the most significant 32 bits of the result; "all" means all 64 bits of the result. One can see in summary that the operations on 13-bit multiplicands and 10-bit multipliers, for example, provide 8 multiplications and 6 additions in a single operation using the principles of merged arithmetic. The first three operations provide sums of squares of differences over 4, 3, and 2 terms, respectively.

For operations that produce low and high results, the carry save adder and carry propagate adder are controlled so as not to propagate carries between the lower and upper 32 bits (or columns, in the case of the carry save adder).

Depending on the application, it would be apparent to extend the logic to satisfy the technical requirements of a given application. For example, in operations 6 through 8 of Table 1, the sum of the product of two 16-bit numbers may not be representable in 32 bits, but other design constraints require limiting the number of output bits to 32. Therefore, these operations are defined to shift their results right by 1 bit so that all results are representable in 32 bits. Discussion of the techniques whereby subtraction can be performed, as in operation 6, is deferred to a later part of the detailed description.

In the described embodiment, the numbers input to the operations are all interpreted as signed numbers in two's complement representation. In addition, one embodiment of the invention uses the technique for fast multiplication of signed numbers in two's complement representation taught by C. Baugh and B. Wooley, "A Two's Complement Parallel Array Multiplication Algorithm", IEEE Trans Computers, vol C-22, no 12, December 1973, pp 1045–1047. According to this technique, a pair of two's complement numbers A and B are represented in binary form as $$A = -a_{n-1}*2^{n-1} + \text{SUM } a_i*2^i$$

$$B = -b_{m-1}*2^{m-1} + \text{SUM } b_j*2^j$$

where A is n bits, B is m bits, all indices start from 0, and SUM sums n−1 terms in the case of A and m−1 in the case of B. The product of A and B, where we assume A is the multiplier and B the multiplicand, can be written as $$A*B = a_{n-1}*b_{m-1}*2^{n+m-2} + (\text{SUM } a_i*2^i)*(\text{SUM } b_j*2^j) - (a_{n-1}*2^{n-1})*(\text{SUM } b_j*2^j) - (b_{m-1}*2^{m-1})*(\text{SUM } a_i*2^i)$$

Since the (SUM $a_i*2^i$)*(SUM $b_j*2^j$) term consists only of unsigned numbers, it can be treated as an unsigned multiplication. After some algebraic manipulations, the other three terms can be arranged into a single partial product term $$2^{n+m-2} a_{n-1}*b_{m-1}$$

and two rows of partial products $$-2^{n-1} \text{ SUM } a_{n-1}*b_j*2^j$$

$$-2^{m-1} \text{ SUM } b_{m-1}*a_i*2^i$$

These two rows can be further simplified according to the definitions 1-bit multiplication and of negation in two's complement arithmetic to the following bit vector expressions:

(~$a_{n-1}$, $a_{n-1}$ AND ~$b_{m-2}$, . . . , $a_{n-1}$ AND ~$b_0$) shifted up n−1 bits (~$b_{m-1}$, $b_{m-1}$ AND ~$a_{n-2}$, . . . , $b_{m-1}$ AND ~$a_0$) shifted up m−1 bits where "~" denotes logical negation and "AND" denotes logical AND. In addition, a "1" term must be added at position n+m−1, $a_{n-1}$ must be added at position n−1, and $b_{m-1}$ must be added at position m−1.

Subtraction Unit

Figure 3A:
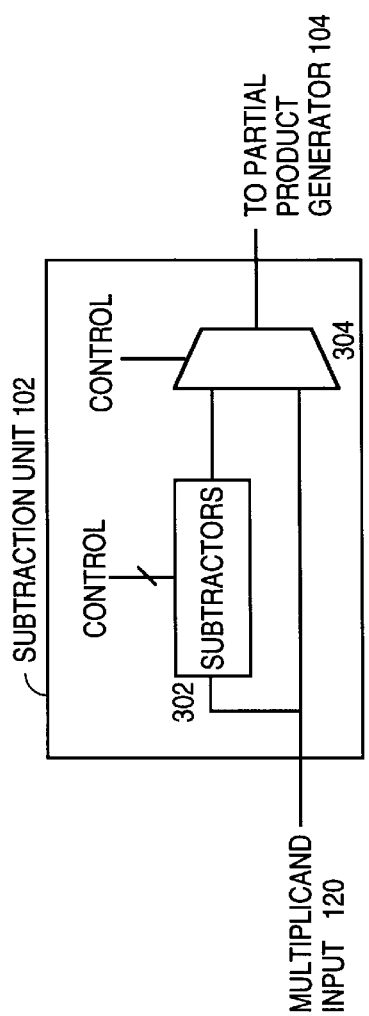
FIG. 3A is a block diagram of a Subtraction Unit according to one embodiment of the invention.

FIG. 3A is a block diagram showing the general structure of the subtraction unit according to one embodiment of the invention. As shown in FIG. 3A, this unit includes subtractors 302, as well as a multiplexer 304 to choose between subtracted and not subtracted operands.

The subtraction unit 102 may be controlled to first subtract 4 pairs of 8-bit numbers or 3 pairs of 10-bit numbers or 2 pairs of 16-bit numbers to create 4, 3, or 2 multiplicands, respectively. As further described with reference to FIGS.

3B–D, this option supports the sums of squares of differences operations, which are operations 1, 2, and 3 in Table 1. When this option is employed, the results of subtracting 8 or 10 bit operands may be extended to 13 bits so that fewer types of hardware may be used following the subtractors.

Figure 3B:
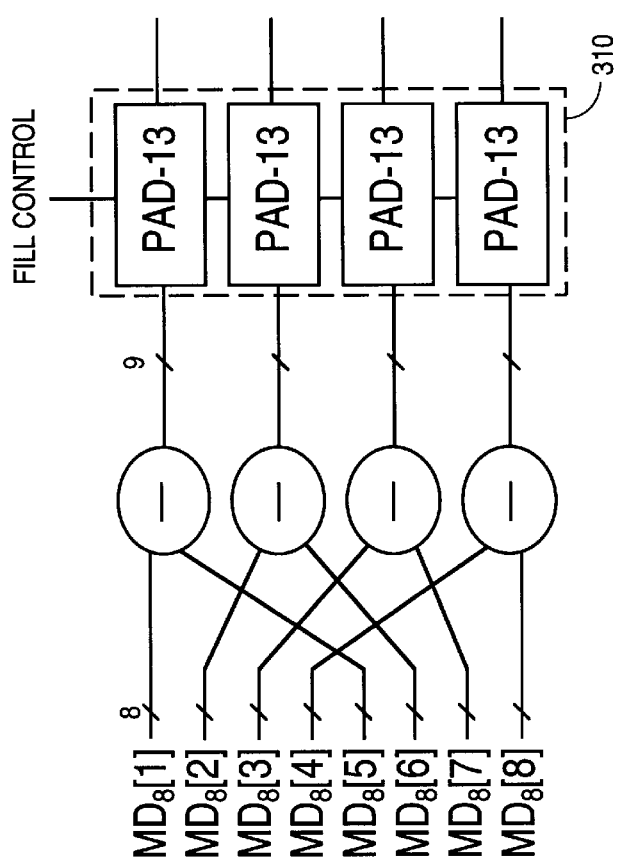
FIG. 3B shows one configuration of the Subtraction Unit according to one embodiment of the invention.
Figure 3C:
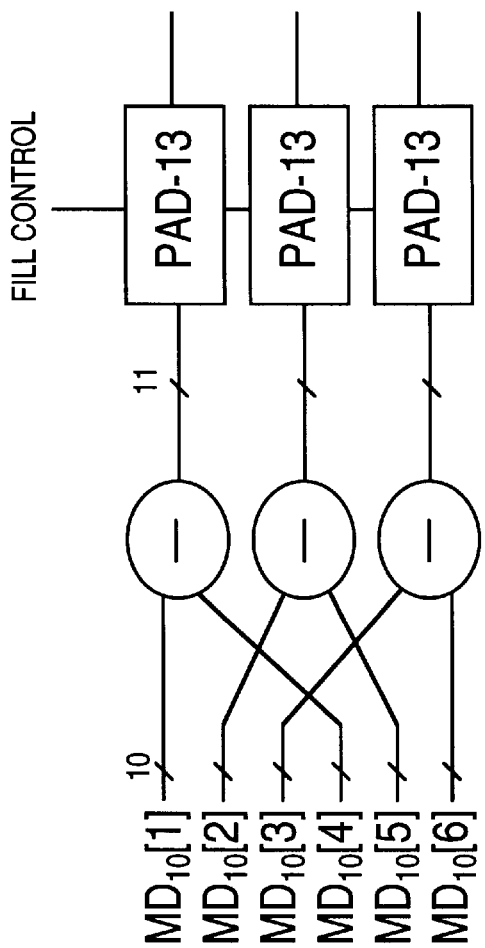
FIG. 3C shows a second configuration of the Subtraction Unit according to one embodiment of the invention.
Figure 3D:
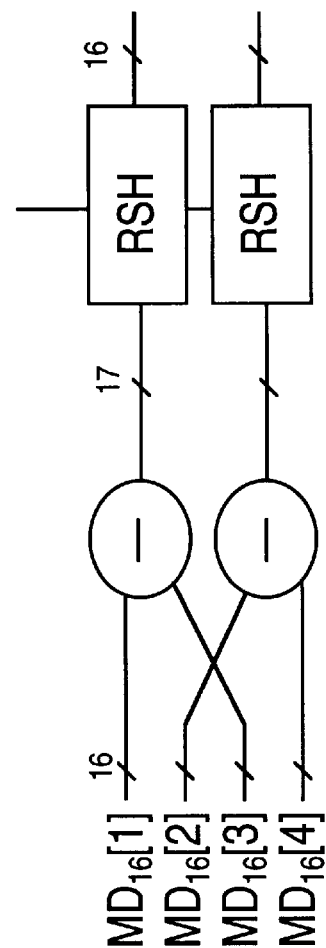
FIG. 3D shows a third configuration of the Subtraction Unit according to one embodiment of the invention.

FIGS. 3B, 3C, and 3D show three operations performed by subtractors 302 as directed by its control inputs according to one embodiment of the invention. In FIG. 3B, 4 pairs of 8-bit operands are subtracted (required by operation 1 in Table 1). The operands come from the set of 64 multiplicand bits in the order shown in the Figure. The subtractions produce results that require 9 bits to represent; these results are padded out to 13 bits by Pad-13 units 310 as shown. Preferably, certain control inputs to the subtractors 302 determine where to place the padding bits, for example, whether to place the subtraction results in the least significant or most significant 9 of the 13 bits.

In FIG. 3C, 3 pairs of 10-bit operands are subtracted (as required by operation 2 in Table 1). The operands come from 60 of the set of 64 multiplicand bits in the order shown in the Figure. The 60 bits may be selected from the 64 multiplicand bits in several ways. In a preferred embodiment, $MD_{10}[1]$, $MD_{10}[2]$, and $MD_{10}[3]$ are respectively selected from bits 1–10, 11–20, and 21–30, while $MD_{10}[4]$, $MD_{10}[5]$, and $MD_{10}[6]$ are respectively selected from bits 33–42, 43–52, and 53–62, for example. (In the foregoing, the least significant bit is numbered as bit 1.) The 10 bit subtractions produce results that require 11 bits to represent; these results are padded out to 13 bits by Pad-13 units as shown. As in FIG. 3B, control inputs are preferably used to determine the placement of subtraction results in each 13-bit output.

In FIG. 3D, 2 pairs of 16-bit operands are subtracted (as required by operation 3 in Table 1). The operands come from all 64 of the multiplicand bits in the order shown in the Figure. The subtractions produce results that require 17 bits to represent; since 16 result bits are wanted, a bit must be removed in this case instead of adding extra padding bits. Preferably, control inputs determine whether the most significant or least significant bit is removed.

Various techniques are possible to optimize the implementation of the subtraction unit; all of which are within the scope of the invention. In particular, FIGS. 3B, 3C, and 3D show a total of 9 subtractors, of which 4 are 8-bit subtractors, 3 are 10-bit subtractors, and 2 are 16-bit subtractors. As one example, the functions shown in FIGS. 3B, 3C, and 3D could be achieved by the use of a single 10-bit subtractor and two 16-bit subtractors, where the 16-bit subtractors are capable of being controlled to "break the carry" at the 8th bit so that each such 16-bit subtractor could be used as a pair of 8-bit subtractors. Appropriate multiplexers and wire routing would also be required to select the appropriate input bits to each subtractor and to control the carry breaking within the 16-bit subtractors according to the operating mode. At the cost of these extra multiplexers and routing, the 9 subtractors of the naive implementation are thereby reduced to 3 subtractors. Additional optimization techniques are described later herein.

Carry Save Adder

In preparation for a full description of the Partial Product Generator 104, it will be convenient to first describe the Carry Save Adder 106. FIG. 4A shows an example of a Carry Save Adder in block diagram form, consisting of an array of columns (e.g., referred to as COL1, COL2, COL3, etc.), each of which may be of different heights, where the height of a given column corresponds to the number of inputs it reduces. Each column may receive data inputs (labeled $K_i$) and carry inputs, and it produces single-bit outputs labeled C and S, and may also produce carry outputs to be fed to the next column. To perform its function of reducing data and carry inputs to the required outputs, each column consists of primitive elements called reducers. In the context of fast multiplication hardware, this term may be applied to any hardware element that receives some number of inputs and produces a smaller number of outputs such that the sum of all the inputs equals the sum of the outputs. In order for this to be possible, some of the outputs must be interpreted as being more significant. In general, it is also possible that some of the inputs may be more significant than others. The following description is based on a commonly used type of reducer that reduces 3 inputs of equal significance to 2 outputs, one having the same significance as the inputs and the other having 1 bit greater significance than the inputs. This type of reducer is sometimes called a "3-2 reducer" and is also commonly known as a "full adder." The output whose significance equals that of the inputs is known as the sum output, sometimes written S, while the output whose significance is greater than that of the inputs is known as the carry output, sometimes written C. A logic diagram showing the function of a 3-2 reducer element in terms of standard Boolean logic elements is shown in FIG. 4B. Alternative embodiments of the invention may use other types of reducers to make carry save adders based on the principles described here.

In FIG. 4A, the rightmost column (COL1) is intended to represent the least significant arithmetic bit; as such it is shown with no carry inputs and $K_1$ data inputs. It produces outputs C and S and some carry outputs, which are connected to the next more significant column (COL2).

For any column, the number of 3-2 reducers is equal to the greatest integer less than or equal to half the total number of inputs. Writing the data inputs for the column COL3 as $D_c$, the propagated carry outputs of the previous column as $O_{c-1}$, and the number of reducers as $R_c$, this can be written as:

$$R_c = \text{Floor}((D_c + O_{c-1})/2)$$

where the Floor function denotes the greatest integer less than or equal to its argument. More generally, if $(D_c+O_{c-1})/2$ is an integer, one of the reducers in the column may optionally be a 2-2 reducer, sometimes known as a "half adder." Alternatively, it may be a 3-2 reducer with one input wired to always be zero. In the following description we assume the second alternative.

There is also a general rule for the number of carries out of a column. Each 3-2 reducer produces a carry, but the final C output from the column is one of those carries, so the number of carry outs going to the next column is one less than the number of reducers in the column. This can be written as $$O_c = R_c - 1$$

With these rules, we can deduce the number of reducers and carries out of each column in FIG. 4A. For example, $R_1 = \text{Floor}(K_1/2)$ and $O_1 = R_1 - 1$; $R_2 = \text{Floor}((K_2+O_1)/2)$ and $O_2 = R_2 - 1$; and so on.

A Carry Save Adder 106 according to the present invention may have any number of columns and each column may have any number of data inputs. In general, the number of columns as well as the number of data inputs in each column will be dictated by the requirements of a specific set of datapath operations in the manner described next.

As previously described, Table 1 defines 12 arithmetic operations supported by one embodiment of the invention. Each of the 12 operations shown in Table 1 requires the summation, in each column of a Carry Save Adder, of a certain number of data inputs. The number of such data inputs depends not only on the definition of the operation but also on the form of multiplicand preprocessing employed in a given design. The number of such inputs according to the form of multiplicand preprocessing used in the described embodiment is shown in Table 2. Each row of Table 2 corresponds to a column of a Carry Save Adder. Specifically, row 1 corresponds to the column whose summand produces the least significant output bit, row 2 corresponds to the column whose summand produces the next to least significant output bit, and so on. Each column of the Table corresponds to one of the operations defined in Table 1. Thus, the leftmost column corresponds to operation 1 in Table 1, the column to its right corresponds to operation 2 in Table 1, and so on.

TABLE 2

| Columns of the Carry Save Adder | Operations from Table 1 |||||||||||| 
|---|---|---|---|---|---|---|---|---|---|---|---|---|
| | #1 | #2 | #3 | #4 | #5 | #6 | #7 | #8 | #9 | #10 | #11 | #12 |
| 1  | 4  | 3  | 2  | 4  | 4  | 2  | 2  | 2  | 1 | 2  | 1  | 1  |
| 2  | 4  | 3  | 2  | 4  | 4  | 2  | 2  | 2  | 1 | 2  | 1  | 1  |
| 3  | 4  | 3  | 2  | 4  | 4  | 2  | 2  | 2  | 1 | 2  | 1  | 1  |
| 4  | 8  | 6  | 4  | 8  | 8  | 4  | 4  | 4  | 2 | 4  | 2  | 2  |
| 5  | 8  | 6  | 4  | 8  | 8  | 4  | 4  | 4  | 2 | 4  | 2  | 2  |
| 6  | 8  | 6  | 4  | 8  | 8  | 4  | 4  | 4  | 2 | 4  | 2  | 2  |
| 7  | 12 | 9  | 6  | 12 | 12 | 6  | 6  | 6  | 3 | 6  | 3  | 3  |
| 8  | 12 | 9  | 6  | 12 | 12 | 6  | 6  | 6  | 3 | 6  | 3  | 3  |
| 9  | 12 | 9  | 6  | 12 | 12 | 6  | 6  | 6  | 3 | 6  | 3  | 3  |
| 10 | 20 | 12 | 8  | 16 | 16 | 8  | 8  | 8  | 4 | 8  | 4  | 4  |
| 11 | 24 | 12 | 8  | 16 | 16 | 8  | 8  | 8  | 4 | 8  | 4  | 4  |
| 12 | 20 | 12 | 8  | 16 | 16 | 8  | 8  | 8  | 4 | 8  | 4  | 4  |
| 13 | 16 | 18 | 10 | 20 | 20 | 10 | 10 | 10 | 5 | 10 | 5  | 5  |
| 14 | 16 | 21 | 10 | 24 | 24 | 10 | 10 | 10 | 5 | 10 | 5  | 5  |
| 15 | 16 | 18 | 10 | 20 | 20 | 10 | 10 | 10 | 5 | 10 | 5  | 5  |
| 16 | 12 | 15 | 14 | 16 | 16 | 14 | 14 | 14 | 7 | 12 | 6  | 6  |
| 17 | 12 | 15 | 16 | 16 | 16 | 16 | 16 | 16 | 8 | 12 | 6  | 6  |
| 18 | 12 | 15 | 14 | 16 | 16 | 14 | 14 | 14 | 7 | 12 | 6  | 6  |
| 19 | 4  | 12 | 12 | 12 | 12 | 12 | 12 | 12 | 6 | 14 | 7  | 7  |
| 20 | 4  | 12 | 12 | 12 | 12 | 12 | 12 | 12 | 6 | 14 | 7  | 7  |
| 21 | 0  | 12 | 12 | 12 | 12 | 12 | 12 | 12 | 6 | 14 | 7  | 7  |
| 22 | 0  | 9  | 10 | 4  | 4  | 10 | 10 | 10 | 5 | 18 | 9  | 8  |
| 23 | 0  | 9  | 10 | 4  | 4  | 10 | 10 | 10 | 5 | 20 | 10 | 8  |
| 24 | 0  | 9  | 10 | 0  | 0  | 10 | 10 | 10 | 5 | 18 | 9  | 8  |
| 25 | 0  | 3  | 8  | 0  | 0  | 8  | 8  | 8  | 4 | 16 | 8  | 9  |
| 26 | 0  | 3  | 8  | 0  | 0  | 8  | 8  | 8  | 4 | 16 | 8  | 9  |
| 27 | 0  | 0  | 8  | 0  | 0  | 8  | 8  | 8  | 4 | 16 | 8  | 9  |
| 28 | 0  | 0  | 6  | 0  | 0  | 6  | 6  | 6  | 3 | 14 | 7  | 10 |
| 29 | 0  | 0  | 6  | 0  | 0  | 6  | 6  | 6  | 3 | 14 | 7  | 10 |
| 30 | 0  | 0  | 6  | 0  | 0  | 6  | 6  | 6  | 3 | 14 | 7  | 10 |
| 31 | 0  | 0  | 2  | 0  | 0  | 2  | 2  | 2  | 1 | 12 | 6  | 12 |
| 32 | 0  | 0  | 2  | 0  | 0  | 2  | 2  | 2  | 1 | 12 | 6  | 13 |
| 33 | 0  | 0  | 0  | 4  | 4  | 2  | 2  | 2  | 1 | 12 | 6  | 12 |
| 34 | 0  | 0  | 0  | 4  | 4  | 2  | 2  | 2  | 1 | 10 | 5  | 11 |
| 35 | 0  | 0  | 0  | 4  | 4  | 2  | 2  | 2  | 1 | 10 | 5  | 11 |
| 36 | 0  | 0  | 0  | 8  | 8  | 4  | 4  | 4  | 2 | 10 | 5  | 11 |
| 37 | 0  | 0  | 0  | 8  | 8  | 4  | 4  | 4  | 2 | 8  | 4  | 10 |
| 38 | 0  | 0  | 0  | 8  | 8  | 4  | 4  | 4  | 2 | 8  | 4  | 10 |
| 39 | 0  | 0  | 0  | 12 | 12 | 6  | 6  | 6  | 3 | 8  | 4  | 10 |
| 40 | 0  | 0  | 0  | 12 | 12 | 6  | 6  | 6  | 3 | 6  | 3  | 9  |
| 41 | 0  | 0  | 0  | 12 | 12 | 6  | 6  | 6  | 3 | 6  | 3  | 9  |
| 42 | 0  | 0  | 0  | 16 | 16 | 8  | 8  | 8  | 4 | 6  | 3  | 9  |
| 43 | 0  | 0  | 0  | 16 | 16 | 8  | 8  | 8  | 4 | 2  | 1  | 8  |
| 44 | 0  | 0  | 0  | 16 | 16 | 8  | 8  | 8  | 4 | 2  | 1  | 8  |
| 45 | 0  | 0  | 0  | 20 | 20 | 10 | 10 | 10 | 5 | 0  | 0  | 8  |
| 46 | 0  | 0  | 0  | 24 | 24 | 10 | 10 | 10 | 5 | 0  | 0  | 7  |
| 47 | 0  | 0  | 0  | 20 | 20 | 10 | 10 | 10 | 5 | 0  | 0  | 7  |
| 48 | 0  | 0  | 0  | 16 | 16 | 14 | 14 | 14 | 7 | 0  | 0  | 7  |
| 49 | 0  | 0  | 0  | 16 | 16 | 16 | 16 | 16 | 8 | 0  | 0  | 6  |
| 50 | 0  | 0  | 0  | 16 | 16 | 14 | 14 | 14 | 7 | 0  | 0  | 6  |
| 51 | 0  | 0  | 0  | 12 | 12 | 12 | 12 | 12 | 6 | 0  | 0  | 6  |
| 52 | 0  | 0  | 0  | 12 | 12 | 12 | 12 | 12 | 6 | 0  | 0  | 5  |
| 53 | 0  | 0  | 0  | 12 | 12 | 12 | 12 | 12 | 6 | 0  | 0  | 5  |
| 54 | 0  | 0  | 0  | 4  | 4  | 10 | 10 | 10 | 5 | 0  | 0  | 5  |
| 55 | 0  | 0  | 0  | 4  | 4  | 10 | 10 | 10 | 5 | 0  | 0  | 4  |
| 56 | 0  | 0  | 0  | 0  | 0  | 10 | 10 | 10 | 5 | 0  | 0  | 4  |
| 57 | 0  | 0  | 0  | 0  | 0  | 8  | 8  | 8  | 4 | 0  | 0  | 4  |
| 58 | 0  | 0  | 0  | 0  | 0  | 8  | 8  | 8  | 4 | 0  | 0  | 3  |
| 59 | 0  | 0  | 0  | 0  | 0  | 8  | 8  | 8  | 4 | 0  | 0  | 3  |
| 60 | 0  | 0  | 0  | 0  | 0  | 6  | 6  | 6  | 3 | 0  | 0  | 3  |

TABLE 2-continued

| Columns of the Carry Save Adder | Operations from Table 1 | | | | | | | | | | | |
|---|---|---|---|---|---|---|---|---|---|---|---|---|
| | #1 | #2 | #3 | #4 | #5 | #6 | #7 | #8 | #9 | #10 | #11 | #12 |
| 61 | 0 | 0 | 0 | 0 | 0 | 6 | 6 | 6 | 3 | 0 | 0 | 1 |
| 62 | 0 | 0 | 0 | 0 | 0 | 6 | 6 | 6 | 3 | 0 | 0 | 1 |
| 63 | 0 | 0 | 0 | 0 | 0 | 2 | 2 | 2 | 1 | 0 | 0 | 0 |
| 64 | 0 | 0 | 0 | 0 | 0 | 2 | 2 | 2 | 1 | 0 | 0 | 0 |

The values in Table 2 are derived according to the principles of merged arithmetic by combining the number of unsigned partial products for each column, according to the chosen type of multiplicand preprocessing, together with the number of signed partial products for the given column according to the teachings of Baugh and Wooley.

The major requirement for a Carry Save Adder to work for a given one of the operations in Table 1 is that it admit a sufficient number of data inputs in each of its columns, at least as many as in the corresponding row of Table 2 in the column corresponding to that operation, and that the data inputs corresponding to the signed and unsigned multiplicand preprocessing for that operation should be wired to the data inputs for the correct columns in the Carry Save Adder, in any order. Thus, a Carry Save Adder, each of whose columns can accept the largest number of data inputs in the corresponding row of Table 2, is capable, in principle, of serving as the Carry Save Adder part of a datapath that can perform any of the operations in Table 1. For this, it suffices to wire the data inputs corresponding to the signed and unsigned multiplicand preprocessing for each operation to the correct column and to wire zeros to those data inputs that are not used in a particular column for a particular operation. Thus, the Carry Save Adder part of a datapath, according to one embodiment of the invention, will accept a number of data inputs in each column that is at least the maximum value of the corresponding row of Table 2. The list of such maximum values is given in Table 3.

TABLE 3

| Column | # Data Inputs |
|---|---|
| 1 | 4 |
| 2 | 4 |
| 3 | 4 |
| 4 | 8 |
| 5 | 8 |
| 6 | 8 |
| 7 | 12 |
| 8 | 12 |
| 9 | 12 |
| 10 | 20 |
| 11 | 24 |
| 12 | 20 |
| 13 | 20 |
| 14 | 24 |
| 15 | 20 |
| 16 | 16 |
| 17 | 16 |
| 18 | 16 |
| 19 | 14 |
| 20 | 14 |
| 21 | 14 |
| 22 | 18 |
| 23 | 20 |
| 24 | 18 |
| 25 | 16 |
| 26 | 16 |

TABLE 3-continued

| Column | # Data Inputs |
|---|---|
| 27 | 16 |
| 28 | 14 |
| 29 | 14 |
| 30 | 14 |
| 31 | 12 |
| 32 | 13 |
| 33 | 12 |
| 34 | 11 |
| 35 | 11 |
| 36 | 11 |
| 37 | 10 |
| 38 | 10 |
| 39 | 12 |
| 40 | 12 |
| 41 | 12 |
| 42 | 16 |
| 43 | 16 |
| 44 | 16 |
| 45 | 20 |
| 46 | 24 |
| 47 | 20 |
| 48 | 16 |
| 49 | 16 |
| 50 | 16 |
| 51 | 12 |
| 52 | 12 |
| 53 | 12 |
| 54 | 10 |
| 55 | 10 |
| 56 | 10 |
| 57 | 8 |
| 58 | 8 |
| 59 | 8 |
| 60 | 6 |
| 61 | 6 |
| 62 | 6 |
| 63 | 2 |
| 64 | 2 |

Figure 4C:
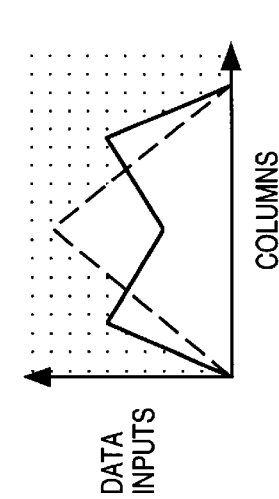
FIG. 4C is a diagram providing an exemplary illustration of the data input requirements for a carry save adder according to one embodiment of the invention.
Figure 4A:
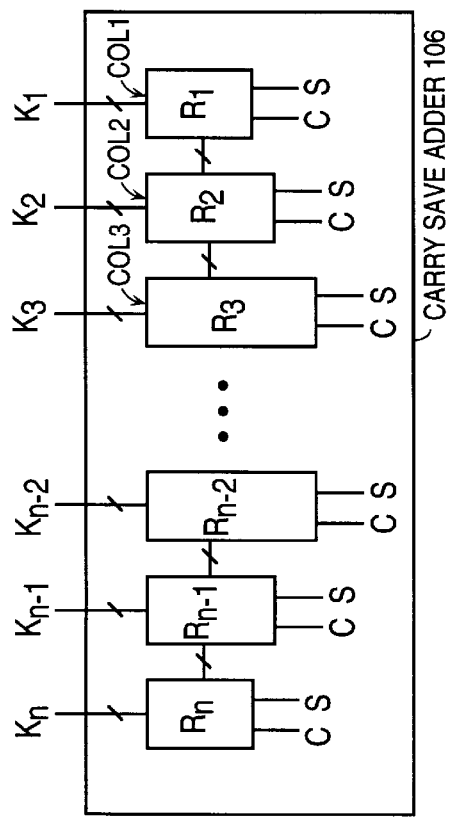
FIG. 4A is a block diagram of the Carry Save Adder unit according to one embodiment of the invention.
Figure 4B:
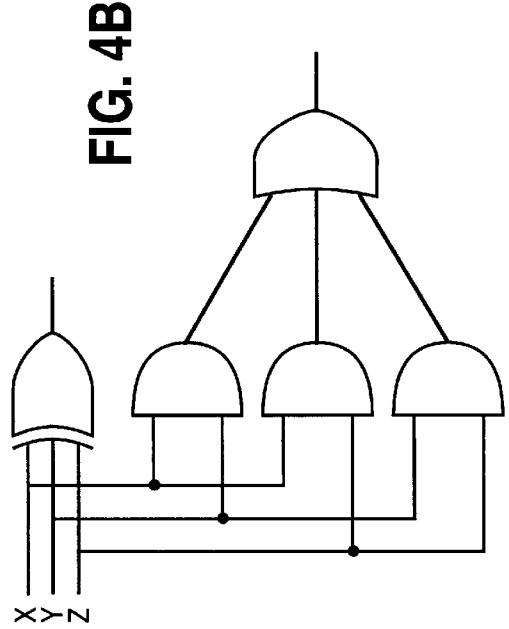
FIG. 4B shows a gate level schematic of the function of the 3-2 reducers used within the Carry Save Adder unit according to one embodiment of the invention.

FIG. 4C is a diagram providing an exemplary illustration of the minimum data input requirements for a carry save adder according to one embodiment of the invention. FIG. 4C shows: 1) increasing numbers of data inputs progressing up a vertical axis; and 2) increasing column numbers of the exemplary carry save adder progressing to the right along a horizontal axis. In addition, FIG. 4C shows a dashed line and a solid line respectively illustrating the exemplary data input requirements of each carry save adder column for a first and second supported operation. Furthermore, a stippled area is shown above the highest data input requirements illustrating the minimum number of inputs for the various columns of the exemplary carry save adder.

A secondary requirement for a Carry Save Adder that can perform any of the operations in Table 1 is that in the case of operations resulting in a "low" and a "high" output, no carries should be propagated between these two parts, or in the specific case of the operations in Table 1, no carries should be propagated between bits 32 and 33 (where bit 1 is the least significant). The details of how this is done are given later.

Similarly, for a different set of supported operations, the Carry Save Adder would accept a number of data inputs in each column that is at least the maximum value of the corresponding row of a table derived from the operations and the chosen type of multiplicand preprocessing, in a like manner to that used to derive Table 2. There may be reasons within the spirit of the invention to include more than the minimum required number of data inputs in each column of the Carry Save Adder. For example, FIG. 2 shows 2 extra inputs to the Carry Save Adder 106 controlled by source selection multiplexers 208. These require 2 more data inputs in every column of the Carry Save Adder, but provide extra flexibility for accumulating previous results or external inputs with the operations defined in Table 1.

The next part of the detailed description concerns the derivation of the number of 3-2 reducers in each column of a Carry Save Adder once a number of data inputs for each column has been specified, such as in Table 3. It has already been shown that a column consisting of R 3-2 reducers has R−1 carry outs and can reduce as many as 2R+1 inputs, where these inputs are divided between data inputs to the column inputs and the carry inputs from a less significant column. In column 1, the least significant column, there are no carry inputs. According to Table 3, column 1 requires 4 data inputs, so 4 is the total number of inputs, and this requires 2 reducers. Thus, in the present example, $R_1=2$, $O_1=1$. Once $O_1$ has been calculated, it is straightforward to calculate $R_2$ and $O_2$ using Table 3. From Table 3, we see that $D_2=4$, so $R_2=\text{Floor}((4+1)/2)=2$, and $O_2=1$. Similarly for column 3. For column 4, $D_4=8$, so $R_4=\text{Floor}((8+1)/2)=4$, $O_4=3$. For column 5, $D_5=8$, so $R_5=\text{Floor}((8+3)/2)=5$, $O_5=4$. It will be clear that this kind of computation can be extended to derive the required number of reducers for all of the columns of the Carry Save Adder. Table 4 shows the results of the computation.

TABLE 4

| Column | Reducers |
| --- | --- |
| 1 | 2 |
| 2 | 2 |
| 3 | 2 |
| 4 | 4 |
| 5 | 5 |
| 6 | 6 |
| 7 | 8 |
| 8 | 9 |
| 9 | 10 |
| 10 | 14 |
| 11 | 18 |
| 12 | 18 |
| 13 | 18 |
| 14 | 20 |
| 15 | 19 |
| 16 | 17 |
| 17 | 16 |
| 18 | 15 |
| 19 | 14 |
| 20 | 13 |
| 21 | 13 |
| 22 | 15 |
| 23 | 17 |
| 24 | 17 |
| 25 | 16 |
| 26 | 15 |
| 27 | 15 |
| 28 | 14 |
| 29 | 13 |
| 30 | 13 |
| 31 | 12 |
| 32 | 12 |
| 33 | 11 |
| 34 | 10 |
| 35 | 10 |
| 36 | 10 |
| 37 | 9 |
| 38 | 9 |
| 39 | 10 |
| 40 | 10 |
| 41 | 10 |
| 42 | 12 |
| 43 | 13 |
| 44 | 14 |
| 45 | 16 |
| 46 | 19 |
| 47 | 19 |
| 48 | 17 |
| 49 | 16 |
| 50 | 15 |
| 51 | 13 |
| 52 | 12 |
| 53 | 11 |
| 54 | 10 |
| 55 | 9 |
| 56 | 9 |
| 57 | 8 |
| 58 | 7 |
| 59 | 7 |
| 60 | 6 |
| 61 | 5 |
| 62 | 5 |
| 63 | 3 |
| 64 | 2 |

Figure 4F:
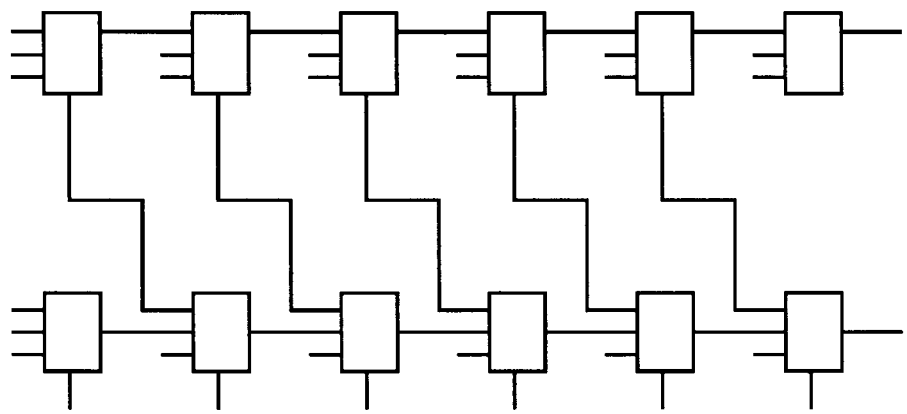
FIG. 4F shows one example of wiring carry outputs between two columns of the Carry Save Adder unit, each consisting of six 3-2 reducers, according to one embodiment of the invention.
Figure 4E:
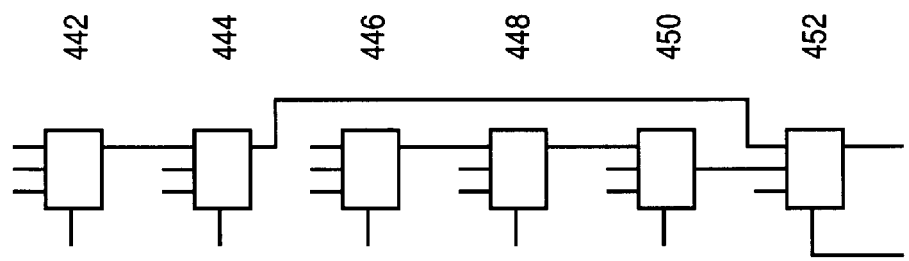
FIG. 4E shows a second way of wiring six 3-2 reducers within a column of the Carry Save Adder unit according to one embodiment of the invention.
Figure 4D:
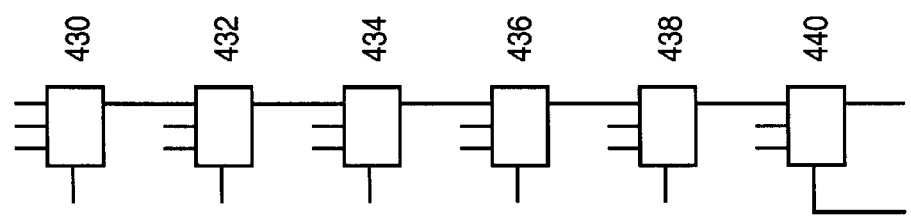
FIG. 4D shows one example of wiring six 3-2 reducers within a column of the Carry Save Adder unit according to one embodiment of the invention.

Next described are possible ways of wiring reducers within and between individual columns of a Carry Save Adder. Consider an arbitrary column of a Carry Save Adder consisting of R reducer, D data inputs and O carry inputs. Since the commutative and associate principles apply to addition, there are many different ways of wiring together these R reducers, as well as connecting the data and carry inputs to the reduces, that will all give the correct result. Specifically, the Sum outputs of the R reducers may be wired in any way that results in a rooted tree, with the final C (Carry) and S (Sum) outputs of the column being the C and S outputs of the reducer at the root of the tree. Furthermore, given any such wiring of the reducers, any connection pattern of the data and carry inputs to the remaining reducer inputs is correct. FIGS. 4D and 4E show two of the many possible ways to wire one column of a Carry Save Adder having a total of 13 inputs.

In FIG. 4D, the connection pattern for the reducers is linear, so that the topmost reducer 430 admits 3 data inputs and the 5 reducers 432 to 440 below it admit 2 data inputs each, for a total of 13. In FIG. 4E, the connection pattern is a tree consisting of the linear wiring of 2 reducers and 3 reducers, both connected at the root 452. Thus, the two topmost reducers 442 and 446 admit 3 data inputs each; while the ones below these labeled 444, 448, and 450 admit 2 data inputs each; and the root reducer 452 admits a single data input.

While the design of a correct connection pattern for the reducers within a column of a Carry Save Adder is not particularly difficult, several other criteria are normally employed in the design of multiplication hardware which impose somewhat more difficult constraints. One of these is regularity. Regularity of interconnection is prized in VLSI design because it reduces the complexity and hence the time required to complete a design; the resulting design is often smaller as well, since irregular interconnections often require extra chip area. Regularity is somewhat difficult to characterize precisely. One definition is given by Mou and Jutand (in "Overturned-Stairs Adder Trees and Multiplier Design", Zhi-Jian Mou and Francis Jutand, IEEE Trans Computers, Vol 41, no 8, August 1992, pp 940–948).

Another important design criterion for multiplication hardware is critical path length, or minimizing the length of the longest path. This concept has been discussed already in the context of optimizing pipelined hardware designs. In the context of a Carry Save Adder design, it amounts to counting the maximum number of 3-2 reducers each input signal passes through before reaching the root of some column. Returning to FIG. 4D, the path length from a data input entering at the topmost reducer 430 to the root 440 is 6. As all the other paths are shorter, this is the longest path with respect to this column. In FIG. 4E, on the other hand, the longest path length is 4, and this path goes from reducer 446 to reducer 452. Other ways of connecting 6 reducers admit of path lengths as short as 3. This principle of tree-like wiring of reducers within Carry Save Adders was first described in the context of designing multiplication hardware by Wallace in "A Suggestion for a Fast Multiplier," C. S. Wallace, IEEE Trans Electron. Comput., February 1964, pp 14–17.

As yet, we have considered path lengths only within a single column. However, each reducer in a column produces a C output that is passed to the next more significant column, and this creates paths that traverse columns. To trace maximum path lengths across columns, it is helpful to label the length of the maximum path exiting each reducer's C output as it enters the next more significant column. For example, supposing that all the inputs to FIG. 4D are data inputs, the maximum path length of the C output of each reducer is equal to its depth in the list: 1 for the topmost reducer 430, 2 for the next reducer 432, and so on. If two columns wired like FIG. 4D are juxtaposed, and still assuming all the inputs to the least significant column are data inputs, then the more significant column has 8 data inputs and 5 carry inputs, whose associated path lengths are 1, 2, 3, 4, and 5. To minimize the longest path in this interconnected set of 2 columns, it is clearly advantageous to place those carry inputs with the largest associated path lengths nearest the root. For example, FIG. 4F shows the two columns wired so as to minimize the longest path within the pair of columns, given the wiring pattern used within each of them. In the leftmost (more significant) column of FIG. 4F, the carries out of the right column have been wired to the next more deeply nested column. Thus, the carries out of the right column do not extend the longest path in the left column beyond the length imposed by the interconnection pattern within the left column itself.

The wiring pattern in FIG. 4F is regular and planar, requiring no crossing wires, at least for the interconnection pattern of the columns themselves. (It is quite likely that crossing wires will be required in order to interconnect the data inputs.) To apply the same ideas to multiple columns wired like FIG. 4E would require crossing wires, at least if the reducers are laid out in the columnar pattern shown in the Figure. Thus, there is a trade off between regularity and the minimization of path lengths within and between columns.

An extension of the design of FIG. 4F to include more columns with the same type of wiring within and between columns would be an example of a correctly wired Carry Save Adder, which would have, in addition, a considerable degree of regularity. Such a design would likely be far from optimal in terms of critical path length, however.

In the described embodiments of the invention, we choose any method of connecting reducers within and between columns that minimizes, or tends to minimize, the length of the longest path within the Carry Save Adder. As the method of designing this interconnection pattern is not an object of the invention, and since any method resulting in a correct interconnection pattern is compatible with the invention, details of a particular interconnection method are not described here.

It was stated earlier that the Carry Save Adder in an embodiment supporting the operations defined in Table 1 should not propagate carries between bits 32 and 33. In order to meet this requirement, "carry breaking" gates should be inserted at appropriate points. As described in connection with the Carry Propagate Adder, this can be done with a single AND gate per carry signal, where one input to the AND is the carry and other is a control signal. In the case of the Table 1 operations, the control signal should be 0 when the operation is 4 through 9 and 1 otherwise; that is, 0 when the carry is to be broken.

Partial Product Generator

The naive technique for generating partial products in a multiplier based on binary digits (i.e. bits) is to generate a first row as the logical AND of each multiplicand bit with the least significant bit of the multiplier, a second row, shifted up by one bit, as the logical AND of each multiplicand bit with the next to least significant bit of the multiplier, and so on. Many high speed multiplication hardware designs preprocess the multiplicand into several numbers so that several bits of the multiplier may be used to control a multiplexer that selects partial products; in this way fewer partial products are generated. This is advantageous because fewer numbers must then be added up in the carry save adder, which generally results in a carry save adder that is both smaller and faster. For example, if MD is the multiplicand and the preprocessing step makes available the values {0, MD, 2*MD, 3*MD}, then 2 multiplier bits may select the appropriate value for each partial products row: bits 0 and 1 selecting the first row, bits 2 and 3 selecting the second row, which is offset by 2 instead of 1 as in the naive case, and so forth. This technique reduces the number of partial products by exactly a factor of 2 in the case of unsigned multiplication; this factor must be adjusted in the case of signed multiplication. As another example, modified Booth 2-bit encoding is a technique for two's complement multiplication that recodes the multiplicand in a way that involves only shifts and negations. However, this technique produces a somewhat smaller reduction in the number of partial products.

Many techniques are known for reducing the number of partial products using different types of multiplicand preprocessing. Some of these are described in "Computer Arithmetic Systems" by Amos R. Omondi, published in 1994 by Prentice Hall. As a general rule, reduction in the number of partial products is proportional to logic complexity in the multiplicand preprocessing step. The invention does not depend on any particular multiplicand preprocessing technique but is compatible with any of them. Although the invention does not require any particular preprocessing technique, a preprocessing technique based on performing the partial product generation using Radix 8 is described to illustrate the invention (not by way of limitation).

Figure 5A:
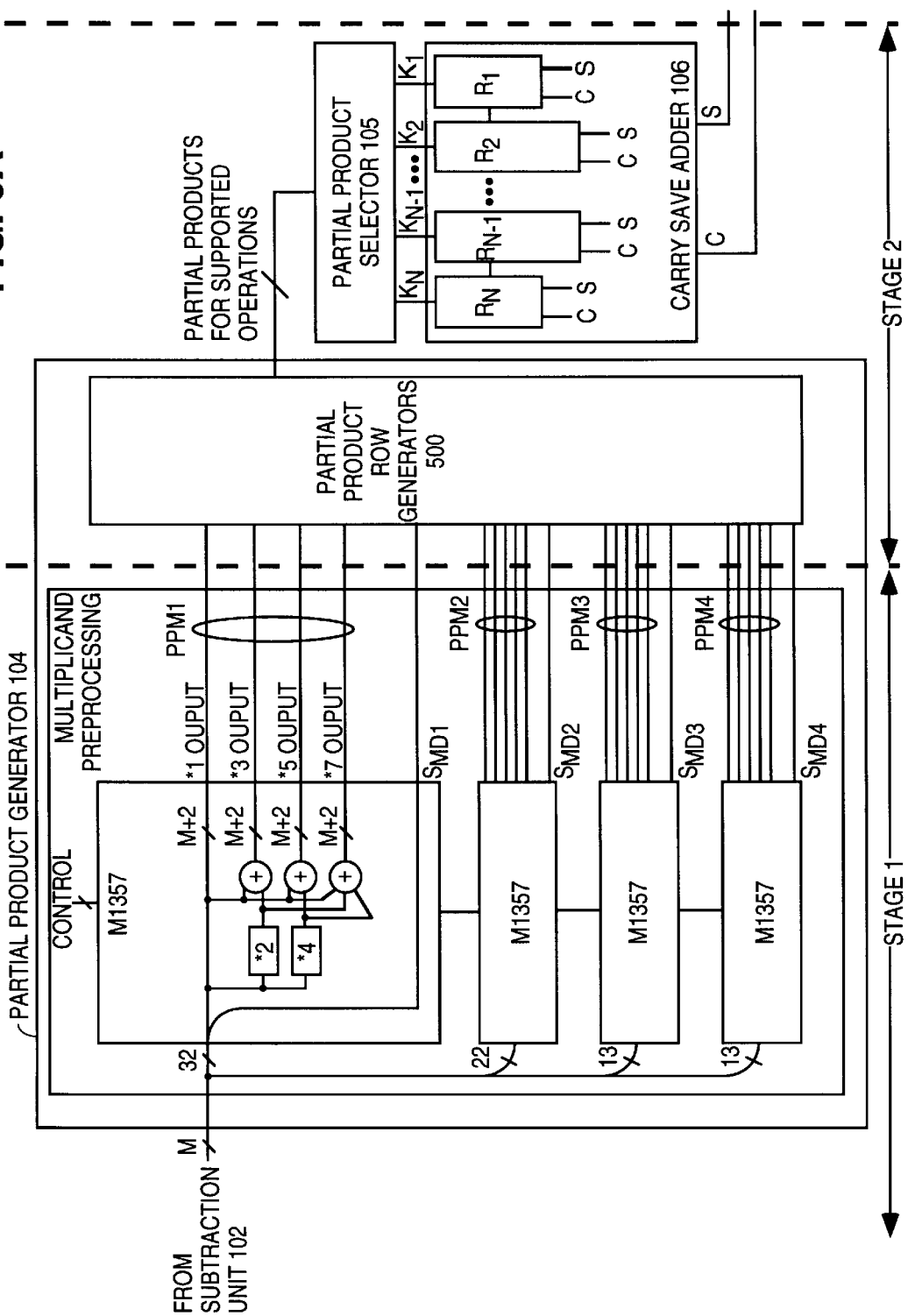
FIG. 5A is a block diagram illustrating a partial product generator according to one embodiment of the invention.

FIG. 5A is a block diagram illustrating a partial product generator 104 according to one embodiment of the invention. In the embodiment of FIG. 5A, the division of the partial product generator 104 into the first and second pipeline stages has been chosen to place the multiplicand preprocessing in pipeline stage 1 and the partial product row generators 500 in pipeline stage 2. As a general rule, techniques that produce greater reductions in the number of partial products require greater logic complexity in the preprocessing step. Since fewer partial products means less logic complexity and greater speed in the carry save adder summation step, it is advantageous to balance the complexity of the multiplicand preprocessing, the partial product row generation, and the carry save summation to allow for a balancing of complexity amongst the pipeline stages. This is advantageous in a pipelined multiplier design such as the one shown in FIG. 2, since the longest path in two parts will be approximately the same, which will allow the greatest possible clock speed. Of course, the invention does not require any specific pipelining scheme, or the use of pipelining at all.

In the embodiment shown in FIG. 5A, the partial product generator 104 produces all of the partial products required for the supported operations. These partial products are provided to the partial product selector 105. As later described herein, the partial product selector 105 selects the appropriate partial products for the currently selected operation and provides them to the appropriate columns of the carry save adder.

Multiplicand Preprocessing

As shown in FIG. 5A, the output of the subtraction unit 102 (or selected bits of that output) is provided to a set of multiplicand pre-multipliers (each labeled M1357) in the partial product generator 104. For a given multiplicand MD, each of the M1357 units generate the values MD, MD*3, MD*5, and MD*7 (hence the label "M1357"). Accordingly, 4 outputs from each M1357 unit are shown, one for each of these 4 products. In addition to these 4 outputs, each M1357 unit passes the sign of the multiplicand to the partial product row generators 500. The number of M1357 units used is equal to the number of multiplicands processed, which in the embodiment supporting the operations in Table 1 is at most four. However, the width of multiplicands processed by the M1357 units varies according to the operation. For example, in operation 4 of Table 1 there are 4 multiplicands which are each 13 bits wide, while in operation 12 there is 1 multiplicand which is 31 bits wide.

FIG. 5A also illustrates what comprises an M1357 unit according to one embodiment of the invention. By way of example, the input data width into the topmost M1357 unit is shown as M, which includes a sign bit and M−1 unsigned bits. The sign bit ($S_{MD}$) is stripped off and made available as an output ($S_{MDi}$). The M−1 unsigned bits are multiplied by 3, 5, and 7 using adders and fixed shift units as shown. While the input data width may be the same for all M1357 units, in the embodiment shown in FIG. 5A the input data widths into the different M1357 units has been adjusted to reduce logic complexity while still supporting the operations of Table 1. In particular, since the larger numbers of multiplicands only occur in conjunction with smaller multiplicand widths, the input data width of the four M1357 units are respectively 31, 22, 13, and 13 (e.g., the topmost M1357 unit can be used for operations in which the multiplicand(s) are up to 31 bits, the second topmost M1357 units can be used for operations in which the multiplicand(s) are up to 22 bits, etc.)

In the description of the subtraction unit 102, one of many techniques for reducing the complexity of the subtraction unit 102 was described. Although the invention is not limited to any particular techniques for reducing the complexity of various parts of the reconfigurable arithmetic datapath, several other exemplary techniques for reducing the complexity of pipelining stage 1 follow. In particular, a similar technique to that described with reference to the subtraction unit 102 can be applied to reduce the complexity of the adders within the variable width M1357 units (e.g., the four variable width M1357 units in FIG. 5A). As previously stated with reference to the operations of Table 1, the larger numbers of multiplicands only occur in conjunction with smaller multiplicand widths. For example, 4 multiplicands occur with a maximum width of 12 bits, 2 multiplicands occur with a maximum width of 21 bits, and one multiplicand occurs with a maximum width of 30 bits. (The sign bits have been stripped off in all cases.) A naive implementation of this requirement might use three 30-bit adders, six 21-bit adders, and twelve 12-bit adders, in addition to multiplexers and control logic to route input signals to the correct set of adders according to the selected operation. With the use of carry breaking techniques, this requirement can be reduced to three 30-bit adders that are also usable as three 21-bit adders or three pairs of 12-bit adders, and three 24-bit adders that are used as either three 21-bit adders or three pairs of 12-bit adders.

As an example of another way to reduce the complexity of pipeline stage 1, it would be possible to merge the subtractors (of the subtraction unit 102) with the adders of the M1357 units into a single logic unit, which could allow application of logic minimization techniques to reduce the length of the longest path within pipeline stage 1. In order to carry out this option, it would first be necessary to select all the possible combinations of subtractors 302 with M1357 units 306, which combinations are determined by control inputs to these units as well as to multiplexer 304. Each such combination would then be merged and optimized separately. The result would require a considerably larger number of logic gates in order to obtain the desired lowering of the length of the longest path. As yet another example of a way to reduce the complexity, a designer might find that the logic merging just described is too costly in terms of required logic gates, and might need to reduce the length of the longest path just a little. In such a case, the designer might focus on the MD*7 step of the M1357 units, which is likely to contain the longest path if implemented with a 3-input adder as shown. One alternative is to implement MD*7 as MD*8−MD*1, which can be done with a fixed shift, negation, and 2-input addition.

Because the inputs to the adders of the M1357 units are offset by one or more bits, the adders may not be required to be as wide as the inputs. Consider for example, the *5 adder for the 13-bit case. First, the sign bit is stripped off, resulting in a 12-bit operand; this is added to a copy of itself shifted up by 2 bits. Although this operation can result in a 15-bit unsigned number, only 10 bits of the addition have 2 input operands. Specifically, the most significant output bit is a carry out, the 2 most significant input bits come from the shifted operand only, and the 2 least significant output bits come from the unshifted operand only. Thus, a 10-bit adder suffices, along with hardware that propagates the carry out of that adder through the 2 most significant input bits. By a similar argument, an 11-bit adder suffices for the *3 case. For the *7 case, assuming it is done as MD*8−MD*1, an 8-bit adder suffices (the negation unit is still required for the full operand width).

As a result, the overall requirement for the preferred set of operations is for four 11-bit adders, four 10-bit adders, and four 8-bit adders; or two 20-bit adders, two 19-bit adders, and two 17-bit adders; or one 29-bit adder, one 28-bit adder, and one 26-bit adder. With carry breaking, this can be implemented, for example, as follows:
1. two 22-bit adders combinable into a single 29-bit adder and decomposable into two 11-bit adders;
2. and two 20-bit adders combinable into a single 28-bit adder and decomposable into two 10-bit adders;
3. and two 17-bit adders combinable into a single 26-bit adder and decomposable into two 8-bit adders.

Partial Product Row Generators

Figure 5B:
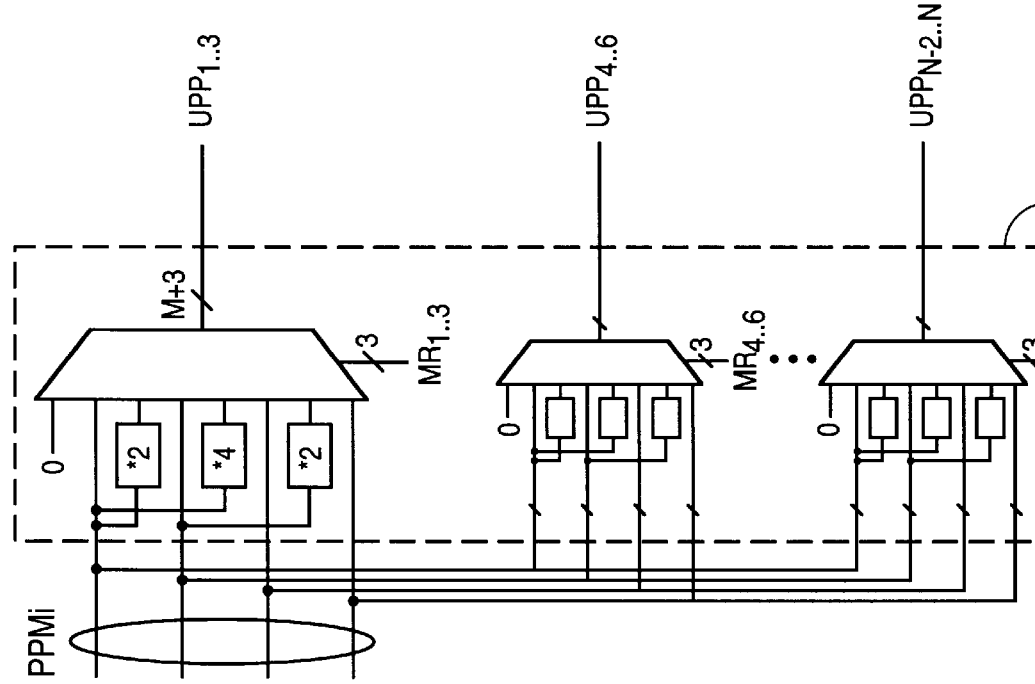
FIG. 5B shows, in the context of a single multiplication operation, a set of 3-bit unsigned partial product row generators combined to generate all the partial products for an unsigned multiplier of any number of bits according to one embodiment of the invention.

FIG. 5B shows, in the context of a single multiplication operation, a set of 3-bit unsigned partial product row generators combined to generate all the partial products for an unsigned multiplier of any number of bits. In FIG. 5B, each 3-bit unsigned partial product row generator receives the 4 outputs of one of the M1357 units 306 and connects them through fixed shifters to an 8-to-1 multiplexer whose three control bits come from the multiplier input 122. For example, the first 3-bit unsigned partial product row generator receives the 4 outputs of one of the M1357 units 306 and connects them through fixed shifters to an 8-to-1 multiplexer whose three control bits are $MR_{1..3}$.

Due to the interconnection pattern shown in FIG. 5B, each partial product generator performs an unsigned multiplication of the M bit multiplicand times 3 bits of the multiplier to generate three partial product bits—e.g., the multiplexer controlled by $MR_{1..3}$ generates unsigned partial product bits 1–3 (labeled $UPP_{1..3}$). Specifically, if the 3-bit multiplier value is 0, the output value 0 is selected; if the multiplier value is 1, the "times 1" output value is selected from the "1" output of the M1357 unit; if the multiplier value is 2, the "times 2" output value is selected by the fixed shift of the "1" output from the M1357 unit; and similarly for multiplier values 3 through 7.

As illustrated, a set of 3-bit unsigned partial product row generators may be combined to generate all the partial products for an unsigned multiplier composed of any number of bits. Specifically, FIG. 5B shows N/3 partial product row generators wired to produce N/3 rows of M+3 bit partial products for an M bit multiplicand and N bit multiplier. These partial products are notated as $UPP_1$ through $UPP_N$. As shown in FIG. 5B, the topmost partial product row generator is controlled by bits 1 to 3 of the multiplier ($MR_{1..3}$), the next partial product row generator is controlled by bits 4 to 6 of the multiplier ($MR_{4..6}$), and so on. When these partial products are assembled in a carry save adder, the output $UPP_{1..3}$ of the first partial product row generator must be connected starting at column 1 (the least significant column), while the output $UPP_{4..6}$ of the next partial product row generator must be connected starting at column 4, and so on, with the output of the final partial product row generator being connected starting at column N−2.

It will be understood that although a single 8-to-1 multiplexer (e.g., the multiplexer receiving $MR_{1..3}$) is shown having M to M+3 bits at each input and at the output, one implementation of the circuit is a parallel array of multiplexers, one for each of the M+3 bits, and wired so that multiplexer number K is connected to multiplicand bit number K on each input line in order to produce output bit number K, for K running from 1 to M+3, and so that all the multiplexers are controlled by the same 3 multiplier bits. Furthermore, when a partial product row generator is conceived in this way as a parallel array of multiplexers, the function performed by the fixed shifters shown in FIG. 5B is obtained simply by wiring the appropriate one of the M1357 unit outputs from the M1357 unit of appropriately greater significance with respect to multiplicand bits. For example, to produce the *6 value into a partial product multiplexer, FIG. 5B shows the *3 value output by the M1357 unit being shifted by 1 (which is equivalent to multiplying by 2). In the context of a parallel array of multiplexers, it would suffice to use the *3 output of the M1357 unit controlled by the same multiplier bits and by the next more significant multiplicand bit.

Figure 5D:
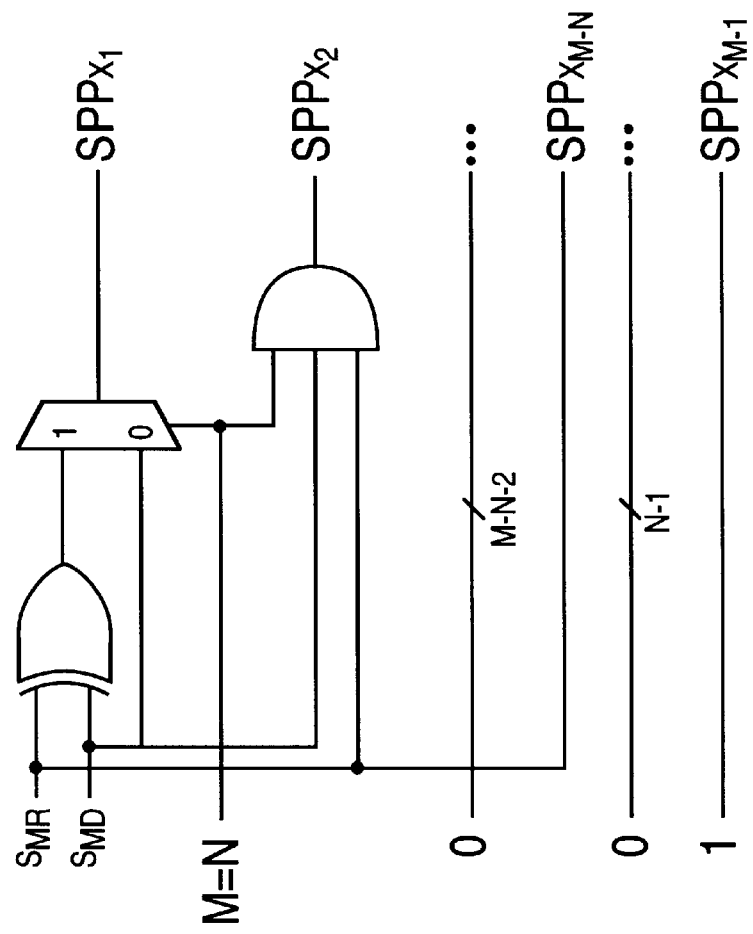
FIG. 5D shows how a third vector of partial product bits may be generated according to the techniques of Baugh and Wooley to complete the extension of the scheme of FIG. 5B to the multiplication of signed numbers according to one embodiment of the invention.
Figure 5C:
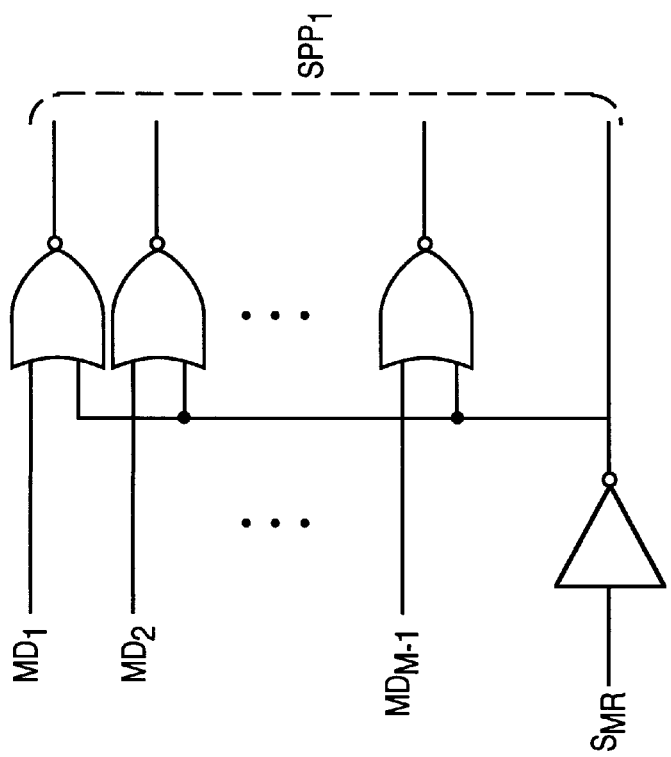
FIG. 5C shows how two vectors of partial product bits may be generated according to the techniques of Baugh and Wooley to extend the scheme of FIG. 5B to the multiplication of signed numbers according to one embodiment of the invention.

FIG. 5C shows how the vector parts of two signed partial products $SPP_1$ and $SPP_2$ are generated. According to the earlier discussion of the Baugh and Wooley technique for two's complement multiplication, there are 3 partial product terms involving sign bits. Two of these are quite regular bit vector expressions where all terms except the most significant have the form S AND $\sim U_i$ where S is a sign bit from either the multiplicand or multiplier, and $U_i$ is the ith bit from the unsigned part of the other operand, i.e., the multiplier or multiplicand respectively. By De Morgan's law, the S AND $\sim U_i$ expressions can be transformed to $\sim(\sim S$ OR $U_i)$. To implement the latter expression, we negate the sign bit and pass it along with $U_i$ to a NOR gate. This is the form shown in FIG. 5C, specifically for $SPP_1$; $SPP_2$ is obtained similarly by negating the $S_{MD}$ sign bit, feeding the $MR_i$ bits into the NOR gates, and substituting length N for M.

FIG. 5D shows how the other signed partial product row may be generated according to the teachings of Baugh and Wooley. This row, whose elements are labeled $SPPx_i$, consists of up to 4 non-zero bits interspersed with zeros. In FIG. 5D, extensions are shown to allow for the case that M=N, that is, that the multiplier and multiplicand have the same length. In this case, the SPPx row must add the two sign bits, $S_{MD}$ and $S_{MR}$ at the same position N−1. Consequently, in case M=N, the first two elements of the SPPx row are shown as the sum and carry, respectively of the sign bits; otherwise, they are $S_{MD}$ and 0, respectively. In FIG. 5D, we assume N is less than or equal to M. If M is greater than or equal to N, the same logic may be used by interchanging M with N and $S_{MD}$ with $S_{MR}$ in the Figure. In FIG. 5D, we also assume that if M≠N, then M is at least 2 greater than N. This is always true in the described embodiments of the invention performing the operations in Table 1; however, in case it is not, the logic shown in FIG. 5D can easily be modified to accommodate it.

The three signed partial product rows $SPP_1$, $SPP_2$, and SPPx, are connected to the carry save adder starting at columns N, M, and N, respectively, where column numbers are counted starting from 1. Of course, the zero elements of the SPPx row need not be connected.

Partial Product Selector

Thus, it has been shown how to generate partial products for a single M by N bit signed multiplication, and where to feed these partial product bits into the columns of the Carry Save Adder. What remains is to describe a method for generating partial product bits and connecting them to columns of the Carry Save Adder in the case that multiple operations are to be supported, such as the set of operations defined in Table 1 as being exemplary of an embodiment of the invention. In order to proceed with this description, it will be convenient to consider the partial product row generators corresponding to the different operations in their interpretation as parallel arrays of multiplexers.

Consider, for example, the operations defined in Table 1. In light of the method of multiplicand preformatting shown in FIGS. 3A and 5, the set of 12 operations requires a Carry Save Adder with 834 data inputs across all of its columns (834 is the sum of the entries in Table 3), which are fed from a total of 4593 partial product bits that are generated from the operations. The contributions of each operation to this total is given in Table 5, wherein the number of partial product bits for the Kth operation is found in the Kth column:

TABLE 5

| Operation | #1 | #2 | #3 | #4 | #5 | #6 | #7 | #8 | #9 | #10 | #11 | #12 |
|---|---|---|---|---|---|---|---|---|---|---|---|---|
| Partial Product Bits | 228 | 261 | 246 | 552 | 552 | 492 | 492 | 492 | 246 | 426 | 213 | 393 |

Figure 6:
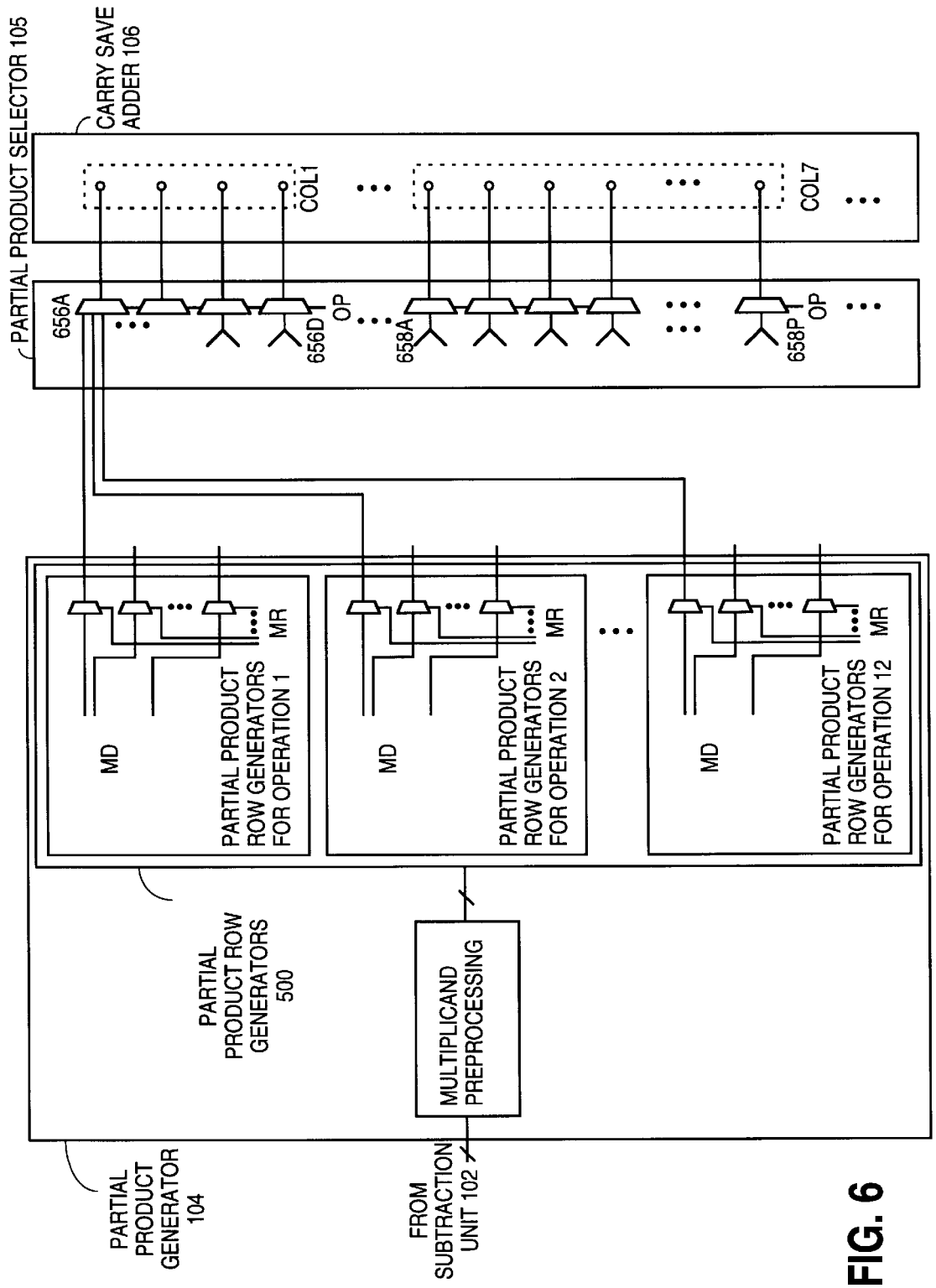
FIG. 6 shows a scheme for generating partial products for a plurality of operations that can be chosen on each cycle to provide reconfigurability, and selectively providing the generated partial product for the currently chosen operation into a single Carry Save Array that has been adapted for reconfigurability according to one embodiment of the invention.

FIG. 6 is a block diagram illustrating the partial product generator and partial product selector designed in a straightforward manner based on the above principles according to one embodiment of the invention. Although the design shown in FIG. 6 is consistent with the invention, the design can be further refined according to further aspects of the invention as described later herein.

In FIG. 6, the partial product generator 104, the partial product selector 105 and the carry save adder 106 are shown. As previously described, the output from the subtraction unit 102 is interpreted during multiplicand preprocessing and provided to the partial product row generators 500. The partial product row generators 500 are divided into sets, with one set for each of the supported operations. In the illustrated embodiment, there are 12 sets of partial product row generators to support the 12 operations in Table 1.

FIG. 6 also shows selected portions of the Carry Save Adder, specifically, the first column (COL1) consisting of 4 data inputs, and the seventh column (COL7) consisting of 16 data inputs. Each data input position to each column of the Carry Save Adder is preceded by a multiplexer (e.g., for COL1 there are multiplexers 656A through 656D; and for COL7 there are multiplexers 658A through 658P). These multiplexers make up the partial product selector 105 and allow the selection of the appropriate partial products to be provided to the appropriate column of the carry save adder based on the currently selected operation identified by Selector Control 133 (in FIG. 1). Accordingly, each of the partial products for a given operation is directed to a data input multiplexer whose output is connected to one of the data inputs of the proper column for that partial product in that particular operation. When no partial product is needed at a particular data input for a particular operation, the corresponding input position of the data input multiplexer for that data input is set to zero. Because a completely detailed wiring diagram for an embodiment supporting the operations in Table 1 would be overly complex, FIG. 6 shows wiring connections schematically. In particular, none of the connections to the data input multiplexers 658A–P are shown in detail, and only a few of the connections to the data input multiplexers 656A–D are shown.

Thus, when the data input multiplexers (656, 658, and so on), for every column of the Carry Save Adder are properly controlled according to the index of the desired operation, FIG. 6 shows a technique for providing the partial products to the Carry Save Adder in a manner that provides a reconfigurable arithmetic datapath implementing a desired set of operations, such as those defined in Table 1.
Complexity Reduction of the Partial Product Row Generators and Partial Product Selector In order to describe the refinements to this scheme that are used in one embodiment of the invention, we refer to Table 6, which shows the combinations of multiplier triples and multiplicand bits required for column 1 of the Carry Save Array by the operations shown in Table 1. Table 6 has 12 rows, with the first row corresponding to operation 1, the second row to operation 2, and so on. In relation to FIG. 6, each column of Table 6 corresponds to one of the data input multiplexers 656A–D, fed by inputs from the partial product generators of the 12 operations. Each entry in the table consists of two numbers (e.g., 1,1). The first is the 1-origin index of the multiplier triples that select the output of the partial product multiplexers (e.g., 1 represents $MR_{1..3}$; 6 represents $MR_{16..18}$; etc.). The second is the 1-origin index of the preprocessed multiplicand bits, which corresponds to one bit of one of the M1357 units 306. In each case shown in Table 6, the second number represents the least significant bit of a multiplicand provided by the subtraction unit 102 (e.g., with reference to operation 1, the 1, 16, 31, and 46 represent the least significant bit of four multiplicands). Thus, each entry tells which multiplier triple and multiplicand input bits generate a particular partial product bit. The number of non-blank columns in row K corresponds to how many partial product bits must be summed in column 1 of the Carry Save Array in order to implement operation number K. When a row of Table 6 has less than 4 columns filled in, the unfilled columns correspond to data inputs to column 1 of the Carry Save Array that are unused for that operation, and therefore must be set to zero. Thus, in a column containing blank spaces, zero is to be fed to the corresponding input of the corresponding data input multiplexer for the operations that are blank.

TABLE 6

| Operations from Table 1 | 656A | 656B | 656C | 656D |
|---|---|---|---|---|
| #1 | 1,1 | 5,16 | 9,31 | 13,46 |
| #2 | 1,1 | 5,16 | 9,31 | |
| #3 | 1,1 | 6,19 | | |
| #4 | 1,1 | 4,16 | 7,31 | 10,46 |
| #5 | 1,1 | 4,16 | 7,31 | 10,46 |
| #6 | 1,1 | 6,19 | | |
| #7 | 1,1 | 6,19 | | |
| #8 | 1,1 | 6,19 | | |
| #9 | 1,1 | | | |
| #10 | 1,1 | 8,25 | | |
| #11 | 1,1 | | | |
| #12 | 1,1 | | | |

While Table 6 describes inputs to only one of the columns of the Carry Save Array, it is representative of all the other columns and enables a description of the methods available within the scope of the invention to simplify generations and connection of partial product bits in all the columns of the Carry Save Array in order to reduce the amount of hardware needed.

Table 6 shows that some combinations of multiplier and multiplicand are repeated for several different operations within a single column of the Carry Save Array. For example, all 12 operations use the same combination for the first data input multiplexer. It would also be possible for combinations to be used repeatedly by different operations in different columns. Generally speaking, it is wasteful to generate the partial product bit for a given combination of multiplier and multiplicand more than once. When the redundant partial product bit generators are removed, many of the partial product row generators will disappear, with the corresponding input to the data input multiplexers (656) being rerouted from the remaining, non-redundant partial product row generators. As such, the division of the partial product row generators into sets, one for each operation (see FIG. 6), will no longer hold true. Instead, certain 3-bit unsigned partial product row generators will be shared by one or more operations. In a VLSI implementation, the increased fanout on the non-redundant partial product generator that results from this may require extra buffering or bigger drivers, but this will generally cost much less than the savings from eliminating redundant partial product generators.

Figure 7:
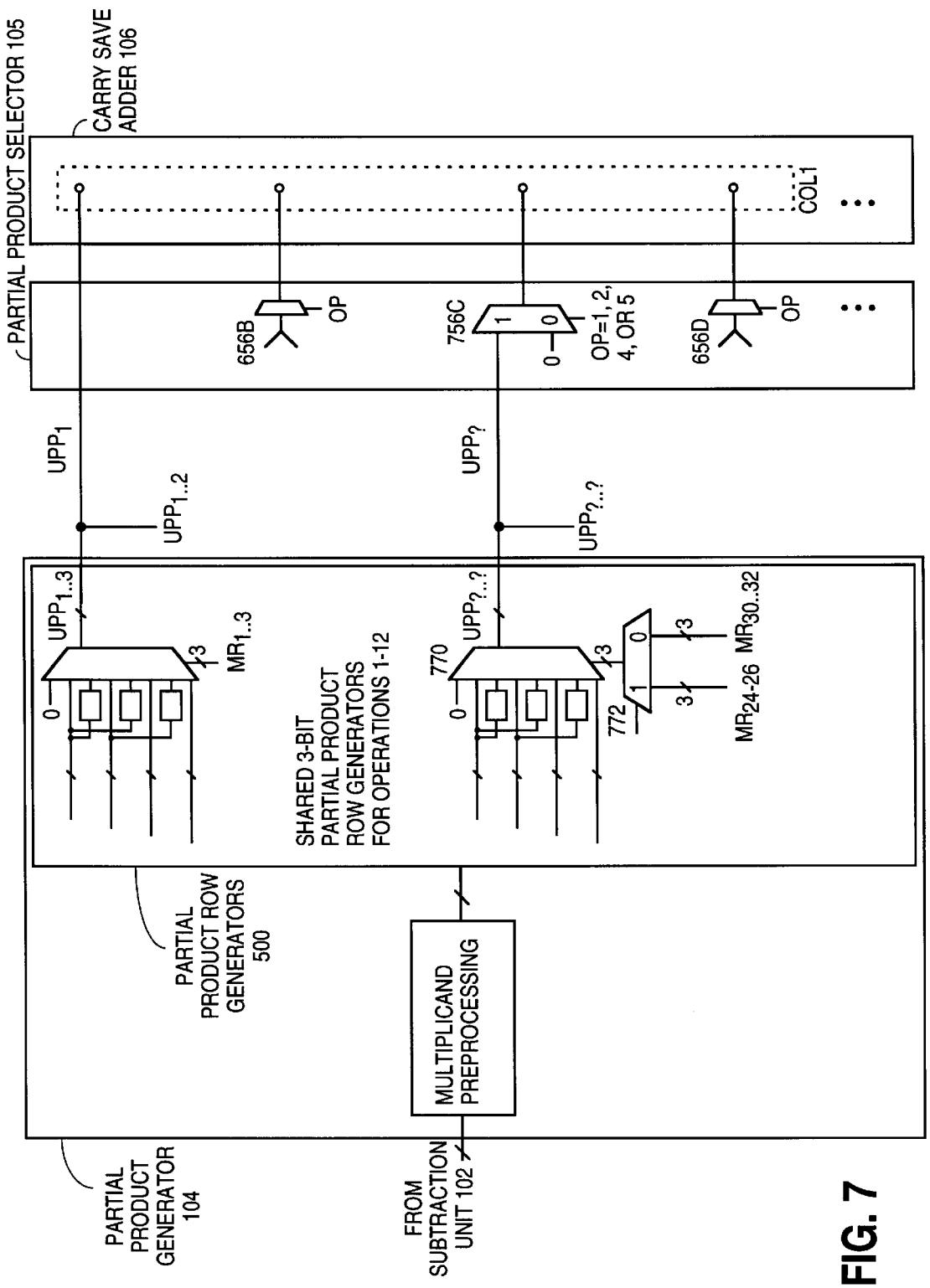
FIG. 7 shows how certain optimizations may be applied to the partial product row generators and partial product selector according to one embodiment of the invention in order to reduce the hardware requirements of FIG. 6 while providing equivalent functionality.

FIG. 7 is a block diagram illustrating that a single 3-bit unsigned partial product generator that generates $UPP_{1..3}$ is shared for all of the 12 operations according to one embodiment of the invention. After elimination of redundant partial product generators has been performed, certain further simplifications may be possible. For example, the data input multiplexer 656A from FIG. 6 is now fed by 12 wires all having the same source. Thus, the multiplexer 656A is completely eliminated in FIG. 7. This data input is a special case of simplifying a data input multiplexer; in other cases, the multiplexer's complexity is reduced but the multiplexer is not completely eliminated. For example, the third data input of COL1 receives 3 different signals: a {9,31} combination, a {7,31} combination, and an empty entry, signifying zero input. It may be advantageous to replace the two combinations with a single partial product generator whose multiplier input is the result of a second multiplexer. This is also shown in FIG. 7, where a partial product generator 770 is controlled by the output of a second multiplexer 772 that can be designated as a "multiplier pre-combination multiplexer." This multiplier pre-combination multiplexer 772 is controlled in turn by a single bit that is set according to a synthesized control function that is 1 when the operation index is 4 or 5 and 0 otherwise. (Note: this assumes the operation indices run from 1 to 12 as is generally assumed within this description. In case the operation indices ran from 0 to 11 or another numeric range, the definition of the controlling function would be adjusted accordingly. In some cases, the numeric range, or the ordering of operations, may affect the complexity of control functions; however, the assignment of operations to operation indices must be consistent across all the data inputs of all the Carry Save Adder columns.) This arrangement of multiplexers replaces a pair of partial product row generators (the pair of partial product row generators that generated the data inputs for multiplexer 656C in Table 6) according to the scheme shown in FIG. 6. In the new scheme shown in FIG. 7, the multiplier pre-combination multiplexer 772 is implemented using three 2-to-1 multiplexer gates, one for each of the multiplier bits; since three such 2-to-1 gates will generally be cheaper than a single 8-to-1 multiplexer gate, the new scheme is likely to be advantageous. When this has been done, the 12-to-1 multiplexer 656C of FIG. 6 is replaced by a simpler 2-to-1 multiplexer 756C of FIG. 7. In addition, a special control signal must be generated for this multiplexer (756C) from the operation index; the signal must be 1 when the operation is 1, 2, 4, or 5.

An exactly analogous optimization can be performed for the fourth data input, where the multiplier pre-combination multiplexer chooses between multiplier bits 10 and 13 and the partial product generator is fed from multiplicand bit 46. A multiplier pre-combination multiplexer can likewise be created for multiplicand bit 16 in the second data input (the second column of Table 6), resulting in a total of 4 distinct inputs. Table 7 shows the result of applying all the optimizations discussed.

TABLE 7

|  | Operations from Table 1 | Inputs | Special Control Signal |
| --- | --- | --- | --- |
| 656A | #1–12 | 1,1 | None |
| 656B | #1,2,4,5 | {5,4},16 | 1 |
|  | #3,6,7,8 | 6,19 | None |
|  | #10 | 8,25 | None |
|  | #9,11,12 | 0 | None |
| 656C | #1,2,4,5 | {7,9},31 | 1 |
|  | #3,6–12 | 0 | None |
| 656D | #1,4,5 | {10,13},46 | 1 |
|  | #2,3,6–12 | 0 | None |

In Table 7, entries enclosed in curly brackets indicate pairs of multiplier triples that go through a multiplier pre-combination multiplexer. Whereas in Table 6, there were 28 partial product generators and four 12-to-1 data input multiplexers, in Table 7 these have been reduced to 6 partial product generators, two 2-to-1 data input multiplexers, and one 4-to-1 data input multiplexer, while 3 multiplier pre-combination multiplexers and logic for a certain number of multiplexer control functions have been added. The same techniques can be applied to all the other columns of the Carry Save Array. The result is a substantial savings in hardware.

Carry Propagate Adder

The carry propagate adder 108 shown in FIG. 1 sums the C and S outputs of the carry save adder either as a pair of 64-bit numbers or as two pairs of 32-bit numbers. The second case can be implemented by "breaking the carry" at the $32^{nd}$ bit position, that is, by not propagating a carry across that position, which has the effect of treating the $32^{nd}$ bit position as the $0^{th}$ bit position of the second pair of numbers to be summed. The decision to break the carry or not can be implemented by an AND gate whose inputs are the carry bit and a control signal that is 0 when the carry is to be broken. In an embodiment of the invention consisting of a different set of supported operations, it may be necessary to break the carry at more than one place, and at places other than the $32^{nd}$ bit position. The extensions needed to do these things are straightforward.

Many techniques for carry propagate adders are known, and the particular technique chosen is not a subject of the invention. In the pipelined version of the invention shown in FIG. 2, it will be desirable to chose an implementation technique for the carry propagate adder that produces a critical path length no longer than that of the other pipeline stages, so that the carry propagate adder stage does not become the bottleneck.

Extensions to Support Subtraction

Figure 8:
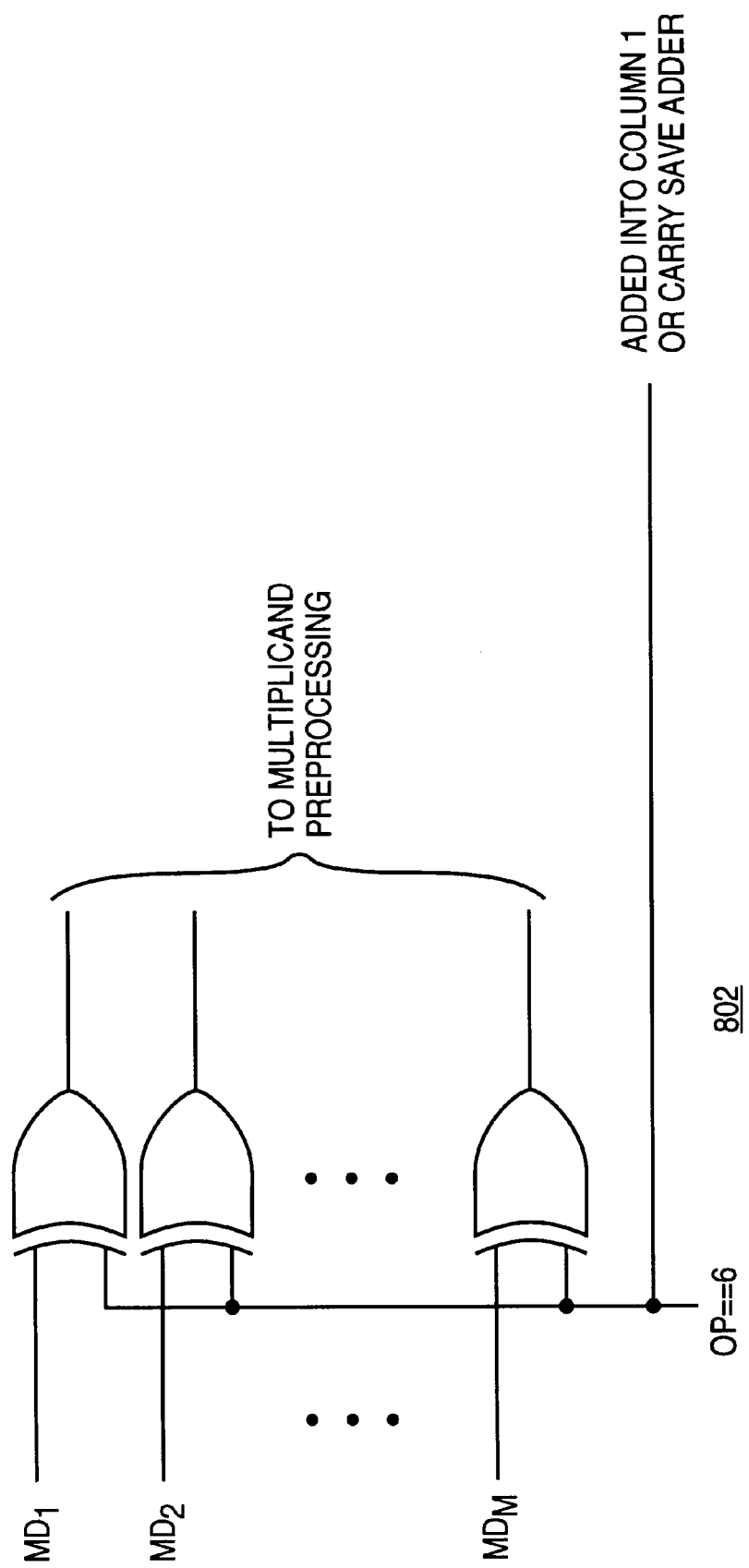
FIG. 8 shows how conditional negation of multiplicands may be accomplished to permit operations that subtract some products from other products according to one embodiment of the invention.

The operations involving subtraction, such as operation 6 in Table 1, will now be described. One way to implement subtraction is to negate one of the operands as it enters the M1357 unit(s) for the specific multiplicand bits which enter into a product that is to be subtracted within the Carry Save Adder. This may reduce the opportunities for sharing partial product row generators for multiplier/multiplicand combinations according to the techniques exemplified in Tables 6 and 7. In addition, the negation must be made conditional on the particular operation being selected. FIG. 8 is a block diagram illustrating an exemplary way this may be done for the case of operation 6 in Table 1 according to one embodiment of the invention. Specifically, a logic signal 802 is developed that is 1 when the operation index is 6. This signal feeds a rank of XOR gates whose other inputs are fed from the multiplicand input, and which thereby conditionally generate 1 less than the two's complement negation of the input. In order to add the necessary value of 1, the logic signal 802 is sent to COL1 of the Carry Save Adder. This input is in addition to those previously required, as described in Table 3, for example. However, no gating logic, such as that discussed in connection with FIGS. 6 and 7, is required in this case. In case of operations having products that are subtracted but output at an initial column K rather than column 1, the logic signal 802 would be sent to column K.

What is claimed is:

1. An apparatus comprising:

a partial product generator to generate sets of partial products, wherein each set of partial products is generated to perform a different operation, at least certain of the different operations involving at least one of a different number of operands and operands of a different numeric precision, wherein said partial product generator generates, responsive to signals indicating the currently selected operation, at least the set of partial products for the currently selected operation;

a carry save adder including a plurality of columns of sufficient height to sum any of the sets of partial products; and a partial product selector coupled between the partial product generator and the carry save adder, and coupled to receive one or more signals indicating a currently selected operation.

2. The apparatus of claim 1, further comprising:

a subtraction unit to selectively subtract different multiplicand inputs and provide the results to said partial product generator.

3. The apparatus of claim 2, wherein said different operations include at least one of a sum of squares of differences, a complex multiply, a multiplication of multiple different pairs of numbers, and a dot product.

4. The apparatus of claim 3, where said different operations also include an operation that performs at least two dot products, where one of the dot products is performed on inputs shifted with respect to the other dot product of the operation.

5. The apparatus of claim 1, wherein said partial product generator comprises:

multiplicand preprocessing circuitry; and a plurality of partial product row generators having inputs coupled to said multiplicand preprocessing circuitry and having outputs coupled to said partial product selector.

6. The apparatus of claim 5, wherein one or more of said plurality of partial product row generators are used to generate partial products in more than one of said sets of partial products.

7. The apparatus of claim 1, wherein:

the partial product generator comprises, a plurality of multiplicand pre-multipliers that each receive a multiplicand and that each provide the result of multiplying that multiplicand by a plurality of predetermined numbers, and a plurality of multiplexers each coupled to receive the output of one of said plurality of multiplicand pre-multipliers as data inputs, and each coupled to receive a part of a multiplier as a control input; and said partial product selector is coupled to the outputs of said plurality of multiplexers.

8. The apparatus of claim 7, wherein said apparatus is pipelined with stages between said plurality of multiplicand pre-multipliers and said plurality of multiplexers, and between said carry save adder and a carry propagate adder.

9. The apparatus of claim 8, wherein said different operations include at least one of, a complex multiply, a multiplication of multiple different pairs of numbers, and a dot product.

10. The apparatus of claim 7, wherein the output of one or more of said plurality of multiplexers is used as part of the partial products in more than one of said sets of partial products.

11. The apparatus of claim 1, wherein the partial product selector is also coupled to receive as selectable inputs the output of the carry save adder.

12. The apparatus of claim 1, further comprising:

a carry propagate adder coupled to the outputs of said carry save adder, wherein the partial product selector is also coupled to receive as selectable inputs the output of the carry propagate adder.

13. An apparatus comprising:

multiplicand preprocessing circuitry coupled to receive a multiplicand input representing one or more multiplicands; and a plurality of partial product row generators having inputs coupled to said multiplicand preprocessing circuitry and having inputs coupled to receive a multiplier input representing one or more multipliers, said plurality of partial product row generators to generate the partial products for at least a dynamically selectable one of a plurality of different operations of which at least certain ones differ in at least one of the number of multiplicands and the numeric precision of the multiplicands;

a plurality of multiplexers having inputs coupled to outputs of said plurality of partial product row generators and coupled to receive a control input identifying the partial products for the currently selected operation as a set of carry save adder inputs; and a carry save adder including a plurality of columns coupled to outputs of said plurality of multiplexers.

14. The apparatus of claim 13, wherein said apparatus is pipelined with stages between said multiplicand preprocessing circuitry and said plurality of partial product row generators, and between said carry save adder and a carry propagate adder.

15. The apparatus of claim 13, further comprising:

an set of subtractors coupled to receive an input;

a set of multiplexers coupled to receive said input, an output of said set of subtractors, and a control signal, said multiplicand preprocessing circuitry coupled to the output of said set of multiplexers to receive the one or more multiplicands.

16. The apparatus of claim 15, wherein at least one of said plurality of different operations is a sum of squares of differences, a complex multiply, a multiplication of multiple different pairs of numbers, and a dot product.

17. The apparatus of claim 13, wherein one or more of said plurality of partial product row generators are used to generate partial products for more than one of said plurality of different operations.

18. The apparatus of claim 13, wherein said partial product row generators generate a plurality of partial products responsive to control signals identifying the currently selected operation, wherein said plurality of partial products includes a first set having the partial products for the currently selected operation and a second set having at least certain partial products for others of the plurality of different operations.

19. The apparatus of claim 13, wherein:
the multiplicand preprocessing circuitry comprises a plurality of multiplicand pre-multipliers to each receive a multiplicand and to each provide the result of multiplying that multiplicand by a plurality of predetermined numbers;
each of the plurality of partial product row generators comprise a multiplexer coupled to receive the output of one of said plurality of multiplicand pre-multipliers as data inputs, and to receive a part of a multiplier as a control input; and
each of said plurality of multiplexers is coupled to outputs of the multiplexers in said plurality of partial product row generators.

20. The apparatus of claim 19, wherein at least one of said plurality of different operations is a complex multiply, a multiplication of multiple different pairs of numbers, and a dot product.

21. The apparatus of claim 20, where another of said plurality of different operations is two dot products, where one of the dot products is performed on inputs shifted with respect to the other dot product of the operation.

22. The apparatus of claim 19, further comprising:
an set of subtractors coupled to receive an input;
a set of multiplexers coupled to receive said input, an output of said set of subtractors, and a control signal, said multiplicand preprocessing circuitry coupled to the output of said set of multiplexers to receive the one or more multiplicands.

23. The apparatus of claim 19, wherein the output of one or more of the multiplexers in said plurality of partial product row generators is used as part of the partial products in more than one of said plurality of different operations.

24. The apparatus of claim 13, wherein the set of carry save adder inputs is also selected from other inputs into the plurality of multiplexers that include at least one of the one or more multiplicands, the one or more multipliers, the outputs of said carry save adder, or the outputs of a carry propagate adder coupled to said carry save adder.

25. A method comprising the computer implemented steps of:
generating sets of partial products in response to an input wherein each set of partial products is generated to perform a different mathematical operation on the input, wherein said step of generating include:
for each of one or more multiplicands, generating a plurality of results that represent the result of multiplying that multiplicand by a predetermined set of numbers, and
for each of the one or more multiplicands, selecting from the plurality of results based on one of one or more multipliers;
selecting a currently selected set of partial products from said sets of partial products based upon a currently selected one of said different operations; and
summing said currently selected set of partial products to generate the result of the currently selected one of said different operations.

26. The method of claim 25, wherein the method includes the preliminary step of:
subtracting certain parts of the input to generate one or more multiplicands.

27. The method of claim 26, wherein said different operations include at least one sum of squares of differences.

28. The method of claim 25, wherein said step of summing includes the steps of:
summing the currently selected set of partial products into a carry and save vectors; and
summing the carry and save vectors.

29. The method of claim 25, wherein a plurality of bits in at least two of said sets of partial products are generated with the same bits of one or more multiplicands and multipliers inputs, and wherein said step of generating also includes the step of generating the at least two of said sets of partial products using a single version of said plurality of bits.

30. The method of claim 25, wherein said step of selecting includes the step of:
selecting said currently selected set of partial products also from an output of summing a previously selected set of partial products to generate the result of a previously selected one of said different operations.

31. The method of claim 25, wherein said different operations include at least one a complex multiply, a multiplication of multiple different pairs of numbers, and a dot product.

32. The method of claim 31, where said different operations also include an operation that performs at least two dot products, where one of the dot products is performed on inputs shifted with respect to the other dot product of the operation.

33. The method of claim 25, wherein at least one of the differences between certain of the different operations is the size of one or more multipliers or the size of one or more multiplicands.

34. An apparatus comprising:
a partial product generator coupled to receive operand inputs and dynamically configure partial product row generators responsive to control signals to generate at least the partial products for a a currently selected one of a plurality of different mathematical operations on those operand inputs;
a carry save adder including a plurality of columns of sufficient height to sum the partial products for any of said plurality of operations; and
a partial product selector coupled between said partial product generator and said carry save adder to select which of the currently generated partial products are provided to said carry save adder, said partial product selector to select the partial products for the currently selected operation.

35. An apparatus comprising:
a partial product generator means for generating partial products for a plurality of distinct mathematical operations, including operations that add or subtract results of multiplying several pairs of input numbers together, said partial product generator means for dynamically configuring partial products row generators for the currently selected mathematical operation responsive to control signals;

a carry save adder means; and a routing means for routing partial products from said partial product generator means to reduction elements of said carry save adder means so that the summation pattern of the carry save adder is configured according to the currently selected mathematical operation.

36. A method comprising the machine implemented steps of:

generating control signals responsive to dynamic selection of one of at least two distinct mathematical operations on input operands, wherein said two operations differ by at least one of the number of multiplicands and the numeric precision of the multiplicands;

dynamically configuring partial products row generators for the currently selected operation responsive to said control signals;

generating a plurality of partial products that includes all partial products for the selected operation and at least certain partial products for the unselected operation;

dynamically routing, responsive to said control signals, all partial products for the selected operation to columns of a carry save adder; and summing the partial products for the selected operation.

* * * * *